United States Patent
Nozaki et al.

[11] Patent Number: 6,134,023
[45] Date of Patent: *Oct. 17, 2000

[54] IMAGE FORMING APPARATUS WHICH OUTPUTS A COLOR IMAGE BY SEPARATING COLOR IMAGE INFORMATION INTO AT LEAST TWO COLOR COMPONENTS

[75] Inventors: Tetsuya Nozaki, Yokohama; Hideki Adachi, Kawasaki; Yoshiyuki Suzuki, Yokohama; Kazuhiko Hirooka, Tokyo; Hiroyuki Ichikawa, Kawasaki; Masahito Yamamoto, Yokohama, all of Japan

[73] Assignee: Canon Kabushiki Kaisha, Tokyo, Japan

[*] Notice: This patent is subject to a terminal disclaimer.

[21] Appl. No.: 08/911,147

[22] Filed: Aug. 14, 1997

Related U.S. Application Data

[62] Division of application No. 08/315,299, Sep. 29, 1994, Pat. No. 5,699,167.

[30] Foreign Application Priority Data

Sep. 30, 1993 [JP] Japan ................................. 5-244735

[51] Int. Cl.[7] ................................. H04N 1/50; H04N 1/60
[52] U.S. Cl. ........................... 358/1.9; 358/530; 358/515; 358/518
[58] Field of Search .......................... 395/109; 382/252, 382/162, 163; 358/534, 535, 536, 533, 298, 530, 518, 1.9, 515

[56] References Cited

U.S. PATENT DOCUMENTS

| | | | |
|---|---|---|---|
| 4,876,610 | 10/1989 | Ohsawa et al. | 358/443 |
| 4,878,125 | 10/1989 | Katayama et al. | 358/443 |
| 4,958,236 | 9/1990 | Nagashima et al. | 358/445 |
| 4,958,238 | 9/1990 | Katayama et al. | 358/456 |
| 4,975,786 | 12/1990 | Katayama et al. | 358/459 |
| 5,008,950 | 4/1991 | Katayama et al. | . |
| 5,021,876 | 6/1991 | Kurita et al. | . |
| 5,081,528 | 1/1992 | Hayashi et al. | . |
| 5,086,484 | 2/1992 | Katayama et al. | . |
| 5,375,002 | 12/1994 | Kim et al. | 358/521 |
| 5,473,446 | 12/1995 | Perumal, Jr. et al. | 358/523 |
| 5,509,085 | 4/1996 | Kakutani | 382/167 |
| 5,565,994 | 10/1996 | Eschbach | . |
| 5,610,990 | 3/1997 | Bannai et al. | 358/298 |

*Primary Examiner*—Scott Rogers
*Attorney, Agent, or Firm*—Fitzpatrick, Cella, Harper & Scinto

[57] ABSTRACT

An image forming apparatus discriminates a color of an inputted color image for each pixel and generates a first color component and a second color component. The apparatus compares values of the first and the second color components, and selects and outputs the color component having a larger value. Meanwhile a color component which is not selected is diffused to neighboring pixels. When pixels neighboring a pixel of interest in a predetermined area are filled with one color component, the other color component is selected and outputted regardless of the values of the first and second color components.

9 Claims, 22 Drawing Sheets

FIG. 6
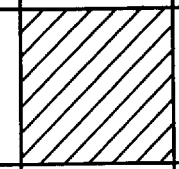
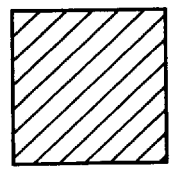 PIXEL OF INTEREST

FIG. 7A
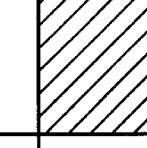
FIG. 7B
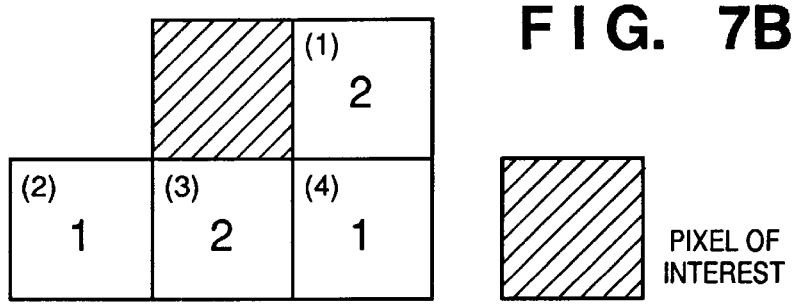
FIG. 7C
| PIXEL | BEFORE DIFFUSION RED | DIFFUSION VALUE | AFTER DIFFUSION |
|---|---|---|---|
| (1) | 50 | 36 × 2/6 | 62 |
| (2) | 30 | 36 × 1/6 | 36 |
| (3) | 130 | 36 × 2/6 | 142 |
| (4) | 90 | 36 × 1/6 | 96 |

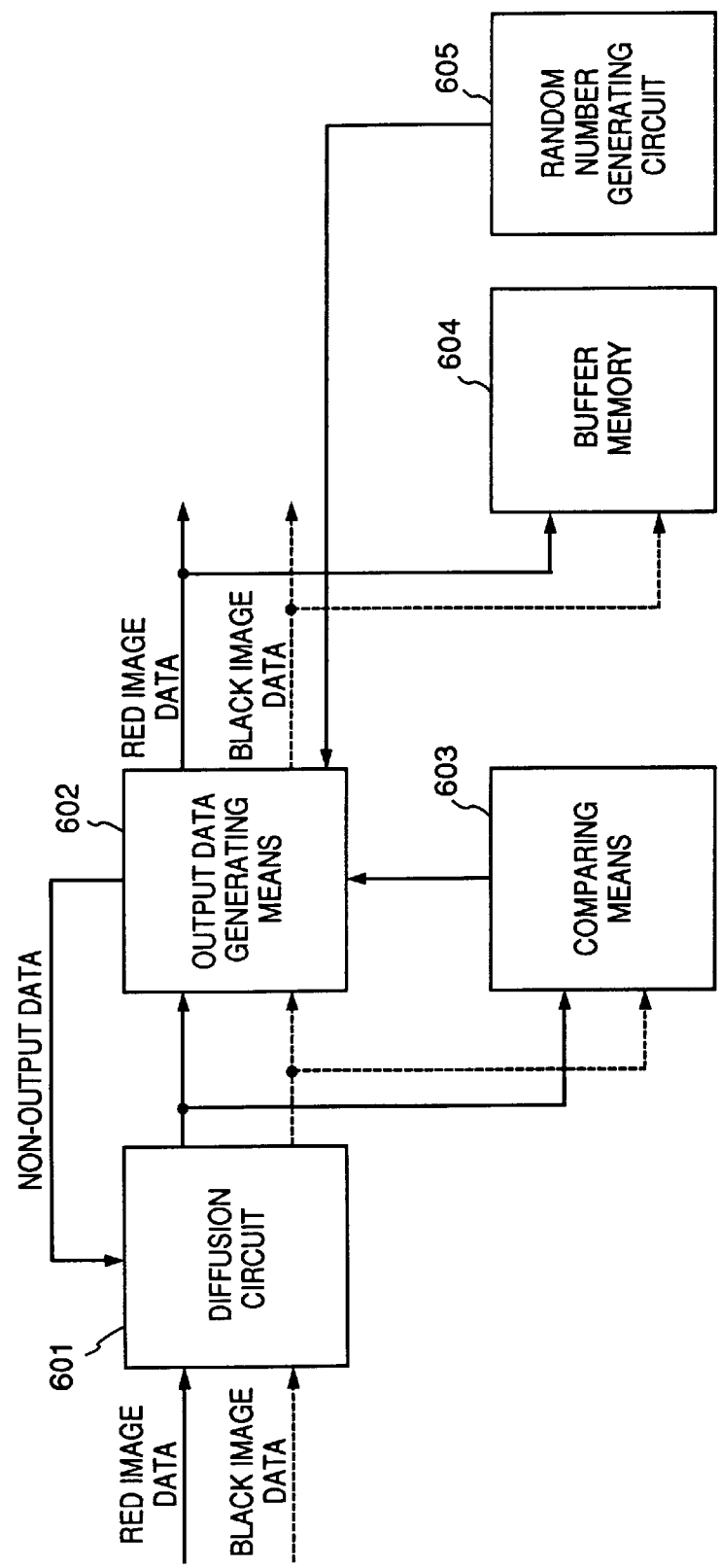

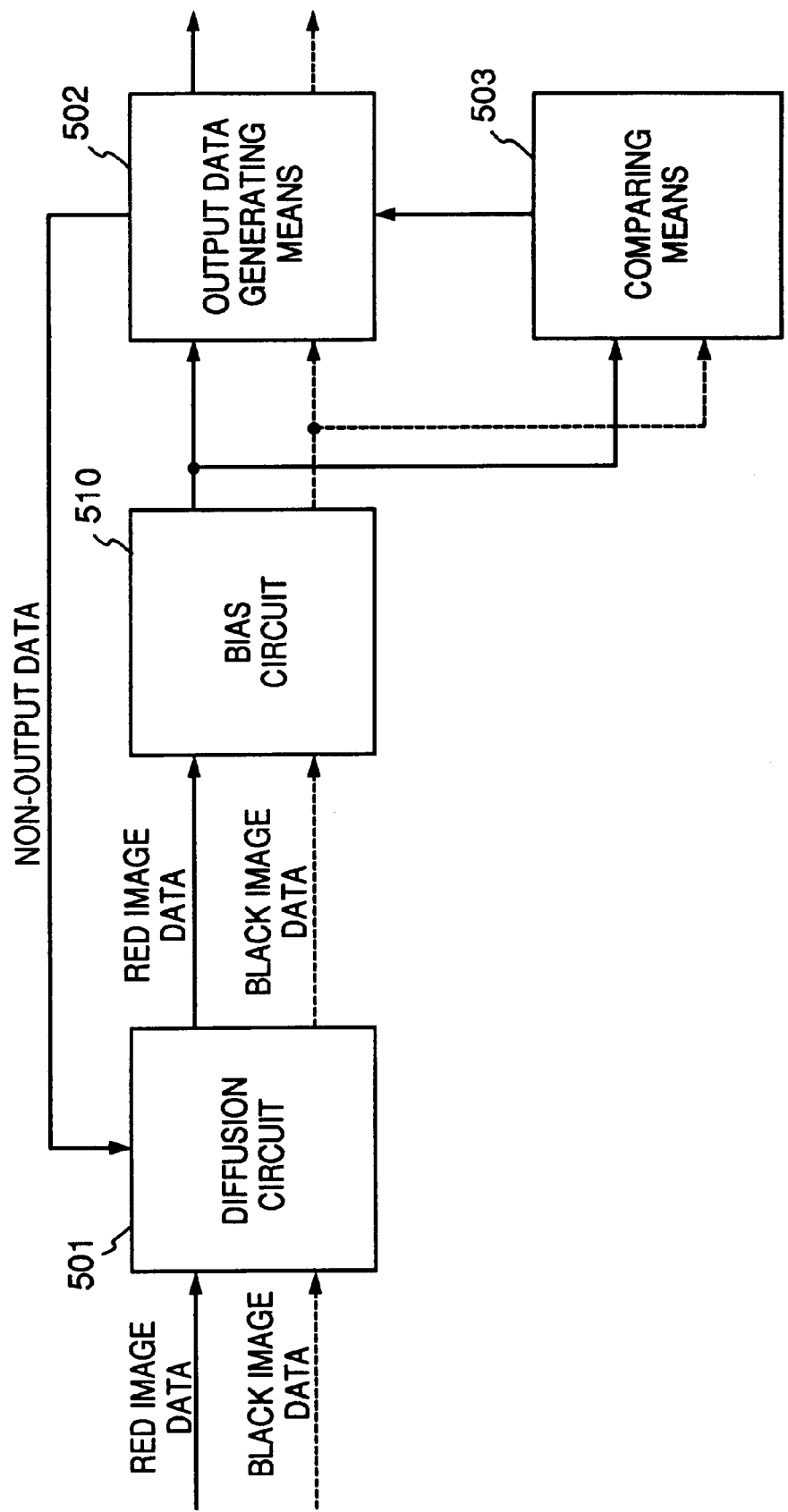

FIG. 20
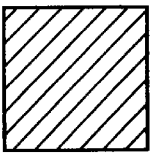
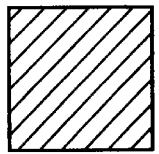 PIXEL OF INTEREST
RED TOTAL = 70+70+15+38 = 193
BLACK TOTAL = 27+70+55+136+44+23+121+24 = 500

FIG. 21A

$$\left( \frac{\text{RED IMAGE DATA OF A PIXEL OF INTEREST}}{\text{BLACK IMAGE DATA OF A PIXEL OF INTEREST}} \right) < \frac{\text{RED TOTAL}}{\text{BLACK TOTAL}} + \frac{\text{RED TOTAL} + \text{RED IMAGE DATA OF A PIXEL OF INTEREST}}{\text{BLACK TOTAL} + \text{RED IMAGE DATA OF A PIXEL OF INTEREST}}$$

$$\frac{}{2}$$

IN THIS CASE, SELECT THE RED IMAGE DATA

FIG. 21B

$$\left( \frac{\text{RED IMAGE DATA OF A PIXEL OF INTEREST}}{\text{BLACK IMAGE DATA OF A PIXEL OF INTEREST}} \right) > \frac{\text{RED TOTAL}}{\text{BLACK TOTAL}} + \frac{\text{RED TOTAL} + \text{RED IMAGE DATA OF A PIXEL OF INTEREST}}{\text{BLACK TOTAL} + \text{RED IMAGE DATA OF A PIXEL OF INTEREST}}$$

$$\frac{}{2}$$

IN THIS CASE, SELECT THE BLACK IMAGE DATA

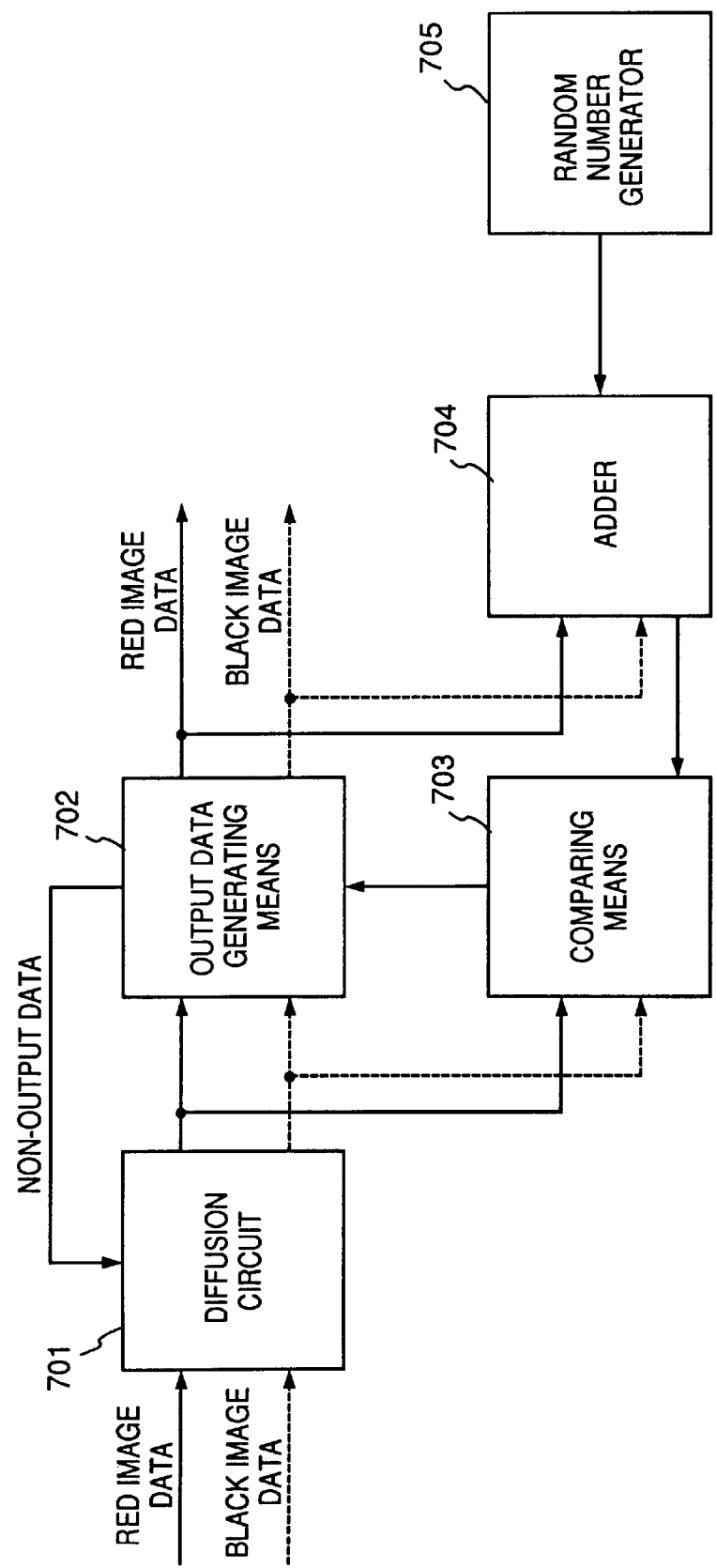

IMAGE FORMING APPARATUS WHICH OUTPUTS A COLOR IMAGE BY SEPARATING COLOR IMAGE INFORMATION INTO AT LEAST TWO COLOR COMPONENTS

This application is a division of application Ser. No. 08/315,299 filed Sep. 29, 1994 U.S. Pat. No. 5,699,167.

BACKGROUND OF THE INVENTION

The present invention relates to an image forming apparatus and, more particularly, to an image forming apparatus capable of receiving and outputting a color image consisting of more than two colors.

An image forming apparatus, such as a digital copy machine, reads a color original image by using an optical-to-electrical converting element, such as a color CCD, and discriminates areas in accordance with color information of the original image, then forms an image corresponding to the discriminated areas whose colors are replaced by colors that are different from original colors (red and black, for example). Further, the suggested image forming apparatus separates a red component and black component, for instance, from the read color image signal, then expresses the original image by using two colors which differ from each other. In other words, the described image forming apparatus forms an image so that the red component is represented by a red color and the black component by a black color, for example.

However, in a case where copying is performed in two colors based on an input color image, if the conventional dot non-color mixing method (the method in which a plurality of colors are not printed at one dot) is employed, there is a problem in that the densities of color components which are not printed are not stored in a copied image, and that the density of the entire image is also not stored.

Although in order to solve the problem non-output data is diffused to the neighboring pixel data are to be outputted, in a case where the method includes a decision process such that the denser color out of the data of the two colors is chosen to be outputted, when an original image which is composed of an uniformly weak color and other strong color is copied, the weaker color is seldom outputted and the color data of the weaker color will not be outputted until the spreading value becomes a substantially large value. Accordingly, there is a problem in that the copied image looks rough.

SUMMARY OF THE INVENTION

Therefore, it is an object of the present invention to provide an image forming apparatus which is able to decide a color component to output for each pixel by using a simple algorithm, and to store the density information of an entire image by spreading non-output color components to the neighboring pixels in the dot non-color mixing method.

It is another object of the present invention to provide an image forming apparatus which, in a case where if outputted data around a pixel of interest represents the same color as in a predetermined area, prevents the same color from being outputted in a group by forcing an output of a color other than the identical color, and which outputs weaker color data before the value of the data becomes too large because of data diffusing.

It is another object of the present invention to provide an image forming apparatus which outputs weak color data before the value of the data becomes too large because of data spreading caused by adding a predetermined value to a predetermined color component.

It is a further object of the present invention to provide an image forming apparatus which, reduces a diffusion value by multiplying the value of a non-output color component by a predetermined coefficient, when a value of the non-output color component is diffused to neighboring pixels or reduces output data by multiplying the output data by a predetermined coefficient during output of a job, thus preventing density of an entire image from increasing.

It is a further object of the present invention to provide an image forming apparatus capable of deciding a color component to output for each pixel on the basis of density information, and storing the density information of an entire image by spreading non-output color components to neighboring pixels in the dot non-color mixing method.

According to the present invention, an image forming apparatus comprises: image input means for inputting color image information; color discrimination means for discriminating each pixel color of an image inputted by the image input means; image processing means for generating a first color component and a second color component based on the color discrimination result by the color discrimination means; comparing means for comparing values of the first and second color components generated by the image processing means; selecting means for selecting either the first color component or the second color component in accordance with the comparison result by the comparing means; diffusion means for diffusing the color component which is not selected by the selecting means to neighboring pixels; and image output means for outputting a plurality of color information independently, wherein the selecting means selects the color component which has the larger value out of the first and second color components on the basis of the comparison result.

Further, according to the present invention, another image forming apparatus, which outputs a color image by separating color image information into at least two color components, comprises: color separating means for separating a pixel of interest of the color image information to be outputted into two color components, namely a first color component and a second color component; color component data generating means for generating a first color component data by adding a first diffusion data to the first color component as well as generating a second color component data by adding a second color diffusion data to the second color component; comparing means for comparing the first color component data and the second color component data; selecting means for selecting either one of the first and second color component data in accordance with the comparison result by the comparing means; diffusion means for diffusing the color component data which is not selected by the selecting means to neighboring pixels, and for assigning the obtained data as the first diffusion data or the second diffusion data; first image forming means for forming an image by selecting a predetermined color out of at least one color in accordance with the first color component data selected by the selecting means; and second image forming means for forming an image by selecting a predetermined color out of at least one color in accordance with the second color component data selected by the selecting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of the stored contents in a buffer memory according to the embodiment;

FIGS. 7A to 7C show an example of methods of diffusing non-output data according to the embodiment;

FIG. 8 is a block diagram illustrating the detailed configuration of a two-color-data processor according to a second embodiment of the present invention;

FIG. 9 is a block diagram illustrating the detailed configuration of a two-color data processor of the present invention according to a third embodiment;

FIG. 20 shows an example of the stored contents in a buffer memory in an adder illustrated in FIG. 19 according to the eleventh embodiment;

FIGS. 21A and 21B show an example of output data deciding methods by output data generating means according to the eleventh embodiment; and FIG. 22 is a block diagram illustrating the detailed configuration of a two-color-data processor according to a twelfth embodiment of the present invention.

DETAILED DESCRIPTION OF THE PREFERRED EMBODIMENTS

Preferred embodiments of the present invention will be described in detail in accordance with the accompanying drawings.

[First embodiment]

Figure 1:
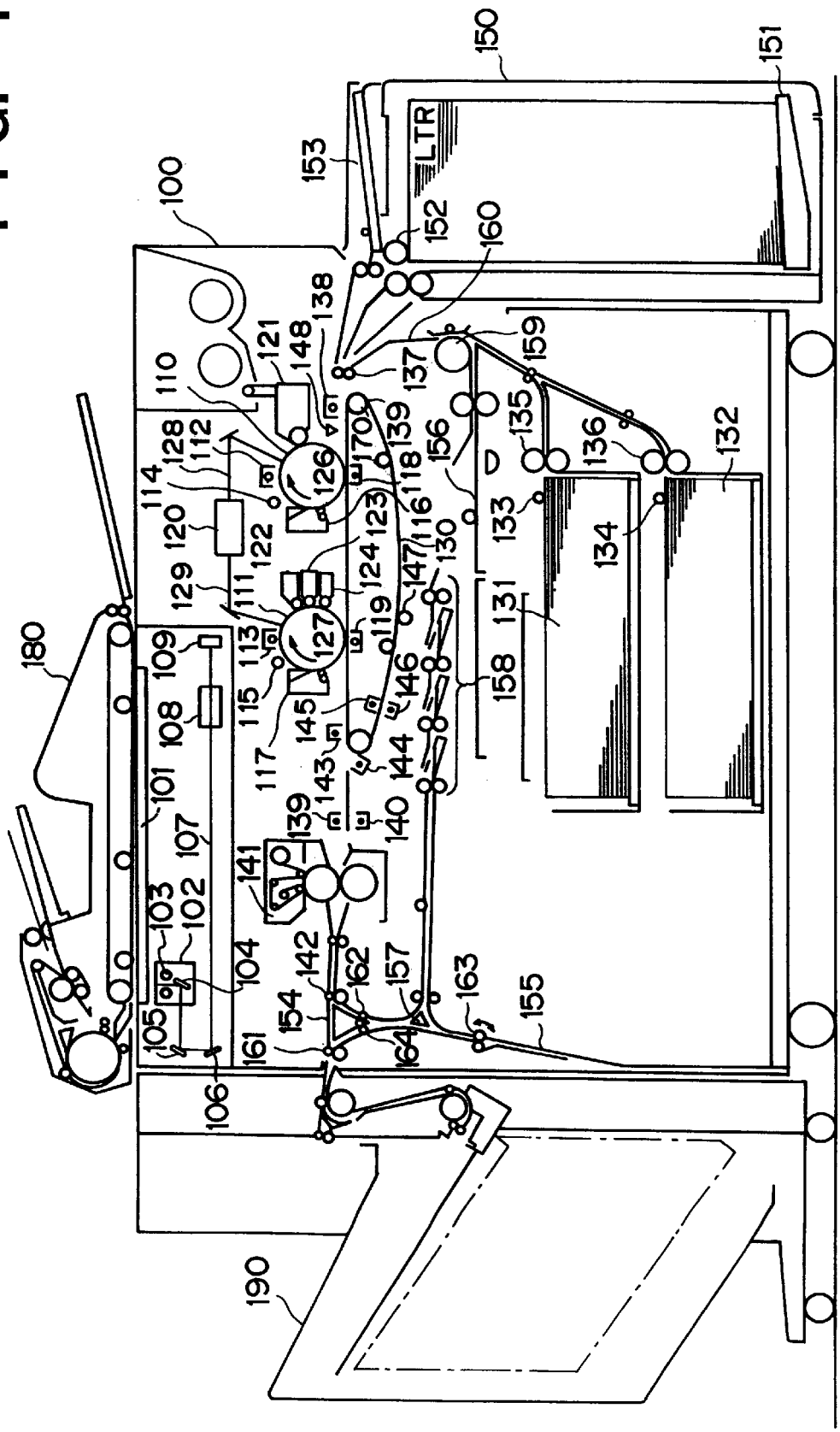
FIG. 1 is a cross sectional view of an image forming apparatus according to an embodiment of the present invention.

FIG. 1 is a cross sectional view of an image forming apparatus in a first embodiment. In FIG. 1, reference numeral 100 denotes a copying apparatus main body; 180, a circulating type automatic document feeder to feed an original automatically (described as "RDF" hereafter); and 190, a sorting apparatus, namely a sorter. The RDF 180 and the sorter 190 are designed so that they can be freely placed and connected with the main body.

The operation of the image forming apparatus of the embodiment is described below.

In FIG. 1, reference numeral 101 denotes a platen glass where the original is placed, a scanner 102 is constructed with a document illuminating lamp 103, a scanning mirror 104, and so on. The scanner is conveyed by a motor (not shown) to scan the original while moving back and forth in the predetermined direction. The reflected light from the image is focused on a CCD sensor 109 via scanning mirrors 104 to 106 after passing through a lens 108.

Reference numeral 107 denotes an exposure control unit which is composed of a laser beam, a polygon mirror, a scanner, and so on, and it irradiates a laser beam 128 and 129 on electrostatic drums 110 and 111, where the laser beam is modulated in dependence upon a image signal which is converted from an electric signal at the CCD sensor 109, further operated by a predetermined image processes that will be explained later.

Around the electrostatic drum 110, there are placed a first charger 112, a black developer 121, transfer charger 118, a cleaning device 116, and a front exposure lamp 114. Further, around the electrostatic drum 111, there are placed a first charger 113, a red developer 122, a blue developer 123, a green developer 124, a transfer charger 119, a cleaning device 117, a front exposure lamp 115. One of the developers 122 to 124 which is selected by a developer switching means (not shown), is placed near the electrostatic drum 111, and the remaining developers are placed at a distance from the electrostatic drum 111. A black image forming unit 126 is constructed with the electrostatic drum 110 and the like, and a color image forming unit 127 is constructed with another the electrostatic drum 111 and the like.

In the black image forming unit 126, the electrostatic drum 110 rotates in the direction shown by an arrow in FIG. 1, driven by a motor which is not shown. After the electrostatic drum 110 is charged up to desired electric potential by the first charger 112, the laser beam 128 is irradiated from an exposure control unit 120, thereby an electrostatic latent image is formed on the electrostatic drum 110. The electrostatic latent image on the electrostatic drum 110 is developed by the black developer 121, thus the image can be visualized as a toner image.

Meanwhile, a transfer paper sheet which is fed from a upper paper feed tray 131 or a lower paper feed tray 132 by either pick-up rollers 133 or 134 is conveyed to the main body by paper feed rollers 135 and 136, further conveyed to a transfer belt by a registroller 137, then the visualized toner image is transferred to the transfer paper sheet by the transfer charger 118. The cleaner 116 removes the left-over toner on the electrostatic dram after the transfer operation, and the residual electric charge is discharged by the front exposure lamp 114.

By performing a similar operation as described above, the visualized toner image is transferred on the transfer paper sheet by a desired developer.

The transfer paper sheet on which the image is transferred is separated from a transfer belt 130, the toner image is re-charged by pre-transfer chargers 139 and 140, then sent to a fixing device 141 to be fixed by applying pressure and heat, finally the transfer paper sheet is conveyed to the outside of the main body 100 by a discharging roller 142.

Reference numeral 138 denotes an attracting charger which attracts a transfer paper sheet sent from the registroller to the transfer belt 130; 170, a transfer belt roller which causes the transfer paper sheet to be attracted and charged by the transfer belt 130 forming a pair with the attracting charger 138 and which is used for a rotation of the transfer belt 130; 143, an electric discharger which makes it easier for the transfer paper sheet be separated from the transfer belt 130; 144, a separating charger which prevents the image from being disturbed by burble electric discharge when the transfer paper sheet is separated from the transfer belt 130.

Further, 139 and 140, the pre-fixing chargers supplement the attracting power of the transfer paper sheet to the toner after being separated and prevent the disturbance of the image; 145 and 146, a transfer belt electric discharger; 147, a belt cleaner to remove pollution from the transfer belt 130; 148, a paper sensor which detects the top edge of a transfer medium fed on the transfer belt 130, and generates a synchronizing signal to indicate the direction of the paper feeding.

The main body 100 contains a deck 150 capable of storing, for instance, 4000 sheets of the transfer paper. A lifter 151 in the deck 150 moves upward corresponding to the amount of the remaining recording paper sheets so that the transfer paper sheet on the top of the pile always touches the paper feed roller 152. Further, the main body also has a multi-manual paper feeder 153 capable of storing one-hundred sheets of the transfer paper.

Furthermore, in FIG. 1, reference numeral 154 denotes a paper-discharging flapper which switches routes for double-sided recording, overlay recording, and the discharging (sorter 300). The transfer paper sheet sent by the discharging roller 142 is conveyed to the route which is switched to either the double-sided recording or overlay recording by the paper-discharging flapper 154. Reference numeral 158 denotes a lower conveying path, and the transfer paper sheet sent from the discharging roller 142 is turned over via a turning-over path 155, successively conveyed to a paper refeed tray 156.

Further, a multiple flapper 157 switches paths of double-sided recording and overlay recording, and the transfer paper sheet is guided directly to a lower conveying path 158 without passing through the turning-over path 155 by way of pulling the multiple flapper 157 down to the left. Reference numeral 159 denotes a paper feed roller for feeding the transfer paper sheet to the side of the electrostatic drum 126 via a path 160, 161 represents an discharging roller, which is placed near the paper-discharging flapper 154, to discharge the transfer paper sheet which is sent to the discharging route by the paper-discharging flapper 154 out of the apparatus.

When double-sided recording (double-sided copying) and overlay recording (overlay copying) are operated, the paper-discharging flapper 154 is moved up, and the copied transfer paper is sent to the refeed tray 156 via the conveying paths 155 and 158 and stored in the state that the transfer paper sheet is turned over. During this operation, if the double-sided recording is operated, the multiple flapper 157 is put down to the right, whereas, if the overlay recording is operated, then the multiple flapper 157 is put down to the left. When the recording on the back-side of the transfer paper sheet, which is the next process after the recording on the front-side of the transfer paper sheet, and overlay recording are under operation, the transferring paper sheet stored in the refeed tray 156 is guided to the registroller 137 of the main body via the path 160 by the paper feed roller 159 one after another from the bottom of the pile in the tray 156.

When the transfer paper sheet is discharged after being turned over, the paper-discharging flapper 154 is moved up as well as the flapper 157 is put down to the right, and the copied transfer paper sheet is conveyed to the conveying path 155. After the end edge of the transfer paper sheet has passed a first feeding roller 162, the transfer paper sheet is sent to the side of a second feeding roller by a turning-over roller 163.

Figure 2:
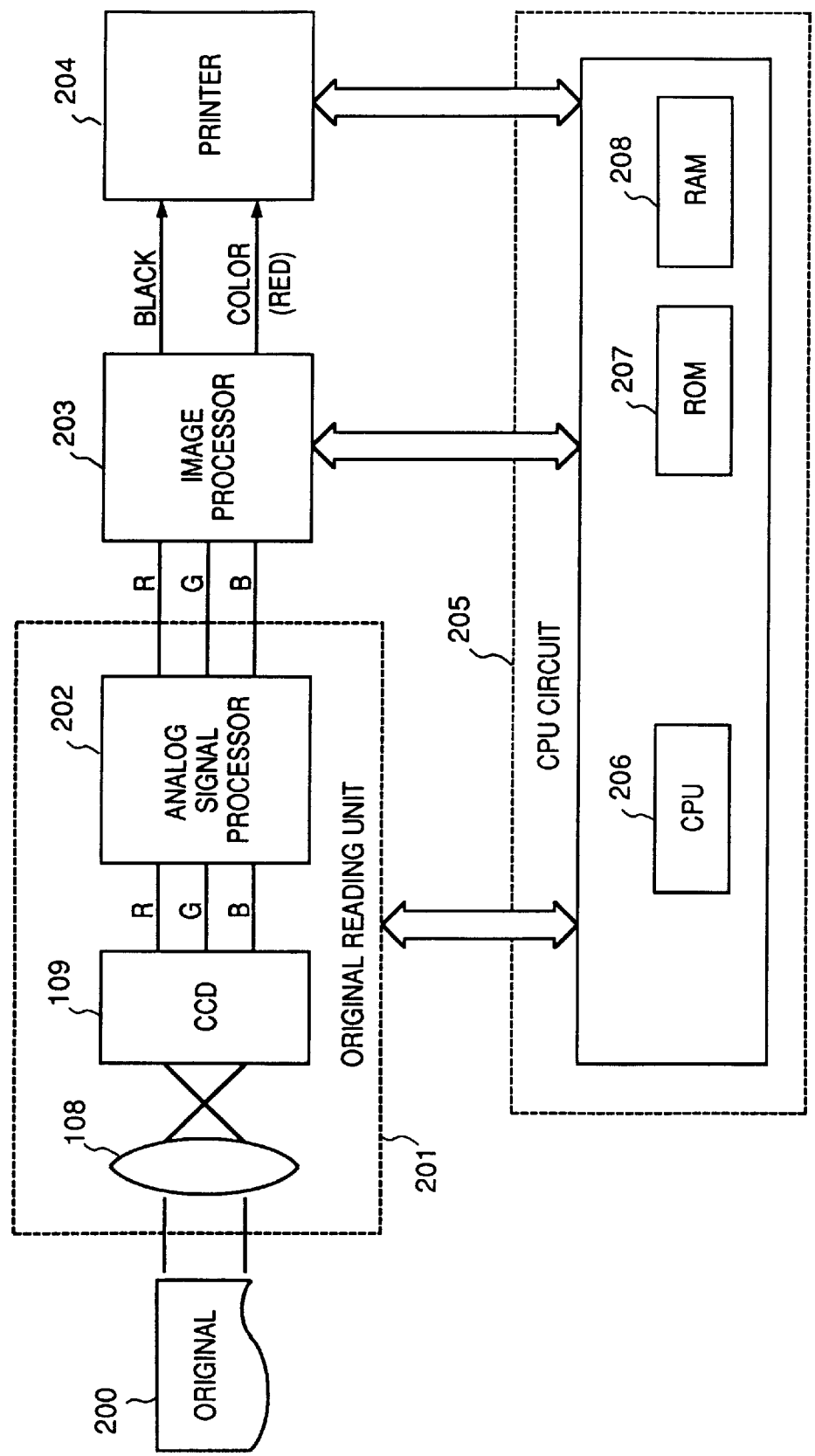
FIG. 2 is a block diagram showing the configuration of an image processor according to the embodiment.

Next, an image processor of the image forming apparatus which contains the aforesaid constitution according to the embodiment will be described. FIG. 2 is a block diagram showing a configuration of the image processor in the embodiment.

As shown in FIG. 2, an image reading unit 201 in the present embodiment is constructed with the lens 108, the CCD sensor 109, an analog signal processor 202, and so on. An original image which is focused on the CCD sensor 109 via the lens 108 is converted into analog signals of R(red), G(green), B(blue) by the CCD sensor 109. The converted image information is inputted to an analog signal processor, then after sample and hold correction, dark-level correction, or the like are performed for each color of R, G, B, the information is converted from the analog information to digital information (A/D conversion). The converted information is inputted to an image processor 203 as a digitized full color signal.

In the image processor 203, correcting operations which are necessary at an image reading unit, such as shading correction, color correction, and $\gamma$ correction, and necessary image proceedings, such as smoothing process and edge reinforcement, are performed. After making these corrections and processes, the image signal is outputted to a printer 204.

The printer 204 is constructed with the exposure control unit 120, the image forming units 126 and 127, a conveying control unit of a transfer paper sheet, etc., all of them have been explained with reference to FIG. 1, and records an image on a printing paper sheet based on an input image signal.

Further, a CPU circuit 205 is constructed with CPU 206, ROM 207, RAM 208, etc., and controls the entire image forming apparatus including the image reading unit 201, image processor 203, and printer 204, further controls each sequence generally.

Figure 3:
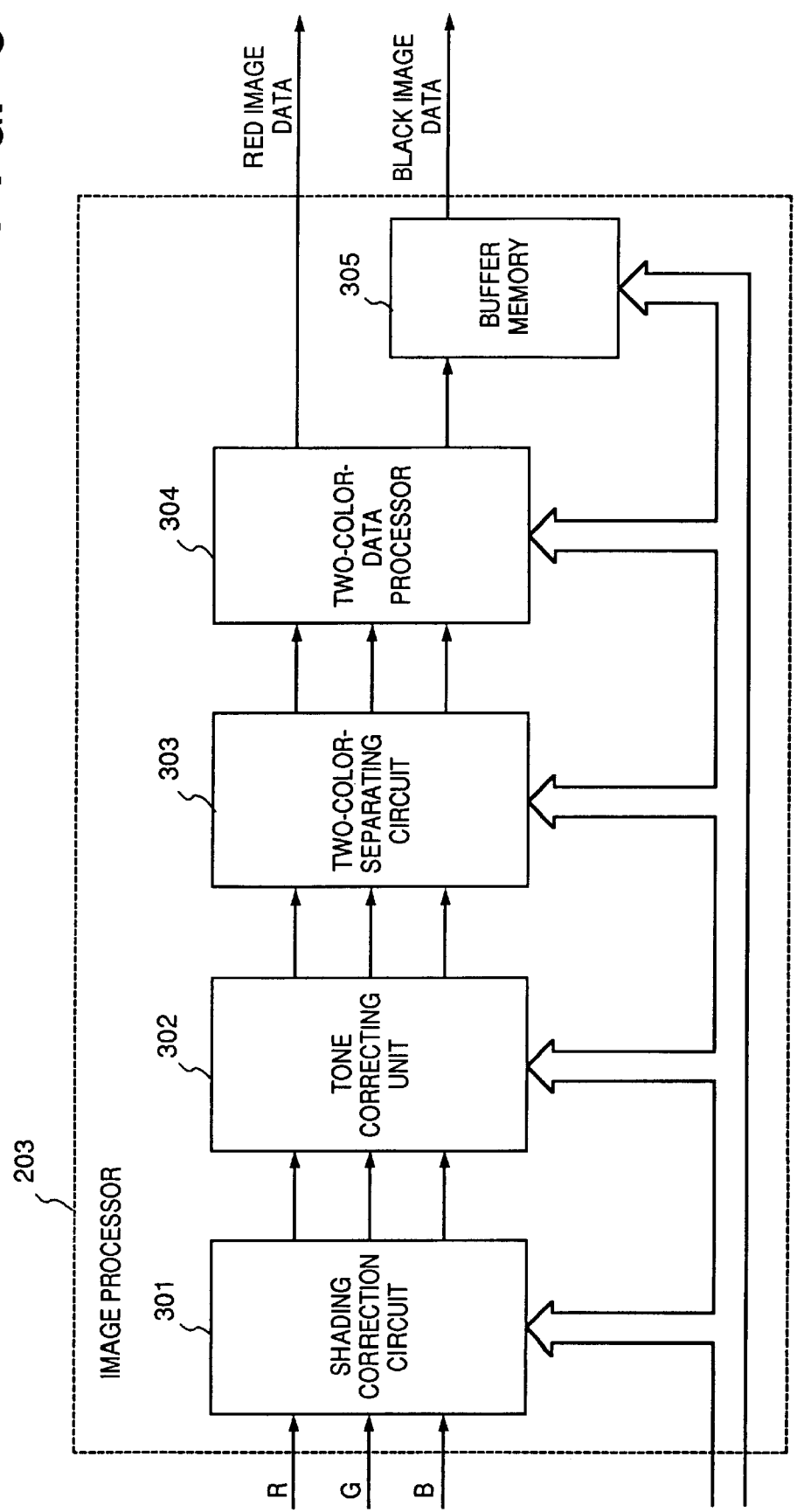
FIG. 3 is a block diagram showing the detailed configuration of the image processor in FIG. 2.

Next, the image processor 203 will be explained. FIG. 3 is a block diagram of the general configuration of the image processor 203.

The digital signals of R, G, and B from the analog signal processor 202 indicated in FIG. 2 are inputted to a shading correction circuit 301. The shading correction circuit 301 corrects variations of characteristics of the CCD 109 when it reads an original image, and corrects light distribution characteristic of the lamp used for illuminating the original. The image signal which is corrected by the shading correction circuit 301 is inputted to a tone correcting unit 302. A luminance signals of R(red), G(green), and B(blue) are logarithmically transformed, and each color signal is converted to density image data of C(cyan), M(magenta), and Y(yellow), each of which are complementary color data.

The density signal which is converted from the image signal is inputted to a two-color-separating circuit 303. The two-color-separating circuit 303 generates image data of red and black, which are colors of toner in the printer, on the basis of the density signal of C(cyan), M(magenta), and Y(yellow).

Figure 4:
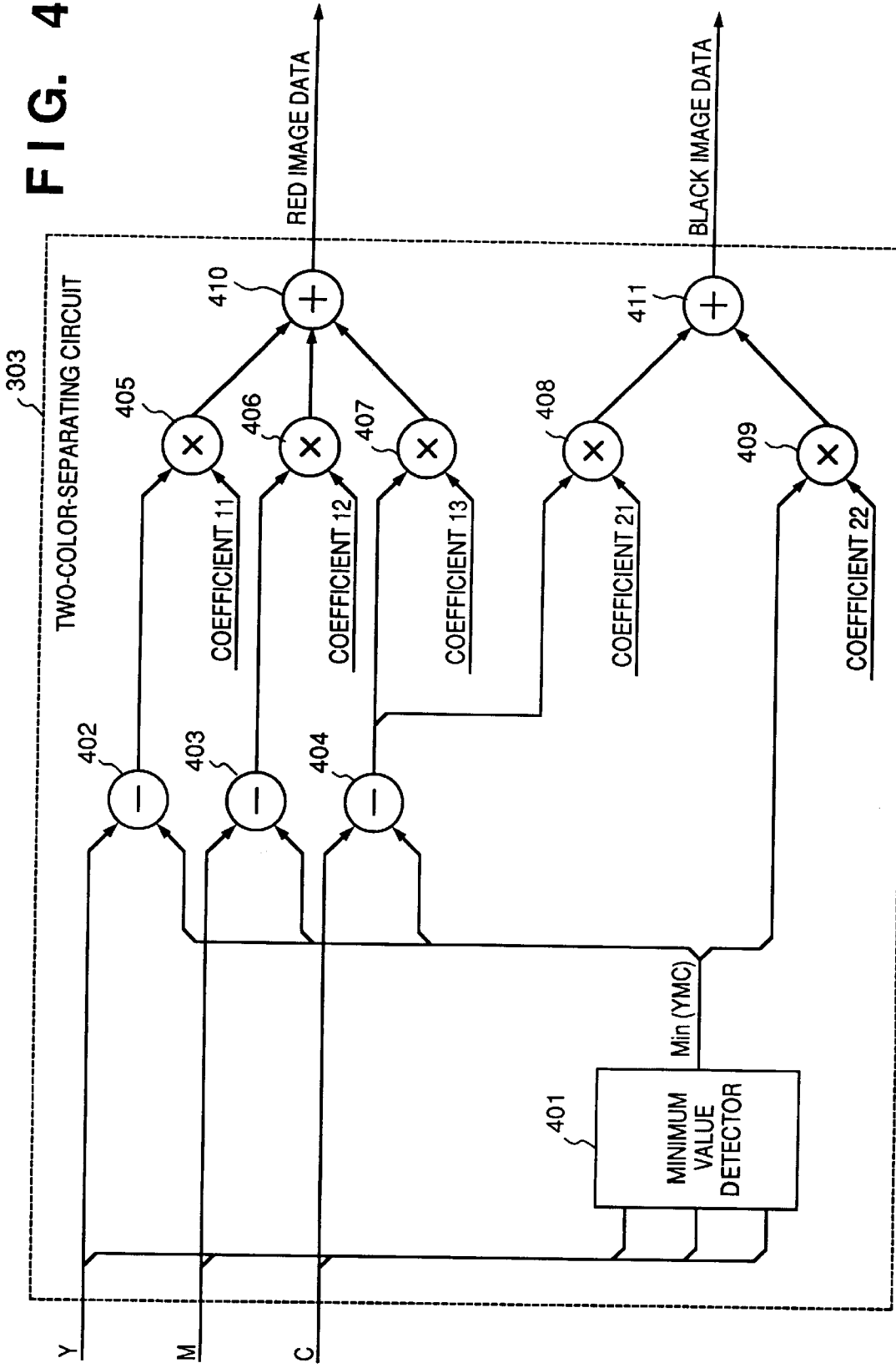
FIG. 4 is a block diagram showing the detailed configuration of the two-color-separating circuit in FIG. 3.

The two-color-separating circuit 303 will be explained in detail below with reference to FIG. 4. FIG. 4 illustrates the detailed configuration of the two-color-separating circuit 303.

In FIG. 4, the density signals of C, M, and Y which are inputted to the two-color-separating circuit 303 are inputted to a minimum value detector 401. The smallest value of the signal among the signals of three colors is detected. Then the signal of the minimum value Min (C, M, Y) detected at the minimum value detector 401 is sent to subtracters 402, 403, and 404, and is subtracted from each density signal of C, M, and Y inputted to the two-color-separating circuit 303 there. This process is the same as the under color removal process (UCR) which is commonly performed in a color scanner or the like.

In this embodiment, red and black signals are generated by using the subtracted signals outputted from the subtracters 402 to 404. First, the method to generate red image will be explained. Density signals of each color which are subtracted at the subtracters 402 to 404 are transferred to multipliers 405, 406, and 407, where the signals are multiplied by predetermined coefficients (coefficients 11, 12, and 13) which are calculated in advance. The products of the multiplications are added at an adder 410, then the sum is outputted as the red image data.

Regarding the generation of black image data, a signal which is generated by subtracting Min(Y, M, C) from the cyan data at the subtracted 404 is transferred not only to the multiplier 407 but also to a multiplier 408, then multiplied by a predetermined coefficient (a coefficient 21) at the multiplier 408. Further, an output signal from the minimum value detector 401 is inputted to a multiplier 409, and multiplied by a predetermined coefficient (a coefficient 22). The products from the multipliers 408 and 409 are added at an adder 411, then the sum is outputted as the black image data.

In other words, the operations in the two-color-separating circuit 303 are:

Red Image=Coefficient 11*(Y−Min(YMC)) +Coefficient 12*(M−Min(YMC)) +Coefficient 13*(C−Min(YMC));

Black Image=Coefficient 22*Min(YMC) +Coefficient 21*(C−Min(YMC)).

After these equations are performed, the red image data and the black image data outputted from the two-color-separating circuit 303 are inputted to a two-color-data processor 304 which is shown in FIG. 3.

Figure 5:
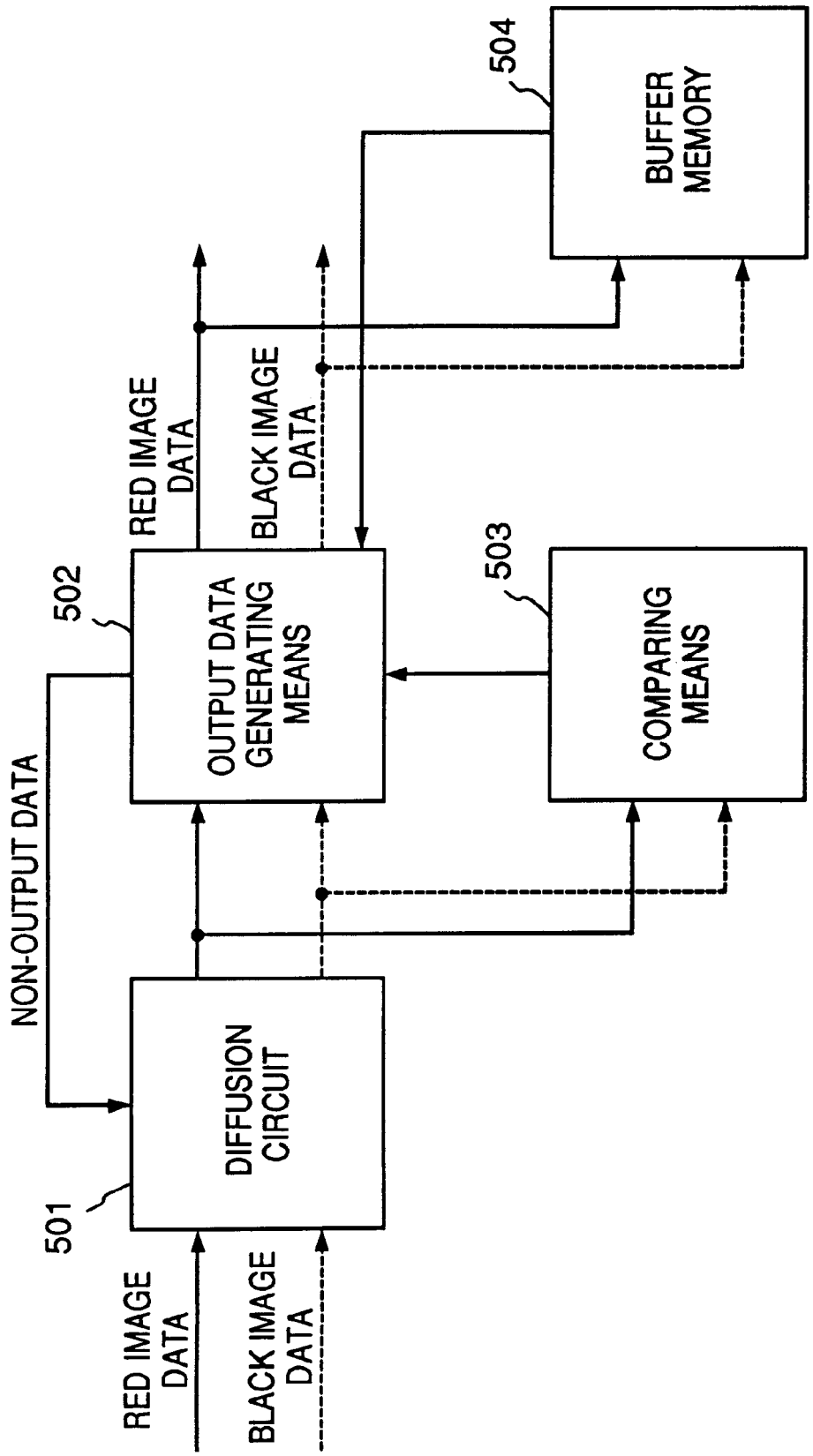
FIG. 5 is a block diagram showing the detailed configuration of the two-color-data processor in FIG. 3.

The detailed configuration of the two-color-data processor 304 is shown in FIG. 5. In FIG. 5, a diffusion circuit 501 diffuses data, which is not selected to be outputted by output data generating means 502, to the red image data and black image data inputted from the two-color-separating circuit 303 in FIG. 3. A buffer memory 504 stores information of the outputted data of pixels which have already been outputted. The configurations of these devices will be explained later in detail.

The red image data and the black image data outputted from the diffusion circuit 501 are inputted to a comparing means 503, where the comparison between values of the red and black image data is performed. The output data generating means 502 decides the output data on the basis of the result of the comparison.

In the present embodiment, the data having the larger value is selected as output data. In case of selecting output data, if the whole area of a predetermined matrix is filled with either one of the red image data or the black image data in accordance with the color information of output data stored in the buffer memory 504, then other image data which is not in the matrix is forced to be selected.

Either red or black image data selected by the output data generating means 502 is outputted from the two-color-data processor 304, and the information about the color component of the outputted data which is selected by the output data generating means 502 is stored in the buffer memory 504.

Recording in the buffer memory 504 will be explained with reference to FIG. 6. FIG. 6 shows an example of contents recorded in the buffer memory according to the embodiment.

Assume that a value of the red image data of a pixel of interest is "38" and a value of the black image data is "45", then the black image data is selected. This is because the data which has the larger data value is selected as output data in this embodiment. However, if the size of the matrix is 2×3, the CPU 206, shown in FIG. 2, reads the content of a 2×3 matrix around a pixel of interest from the buffer memory 504 content of the buffer memory shown in FIG. 6, and detects whether or not the content of the matrix entirely represents only one color. If the matrix is filled with one color, then the CPU 206 selects the other color. In a case as shown in FIG. 6, the matrix around the pixel of interest is filled with black, therefore, the red image data is selected.

Here, the non-output image data is diffused to the neighboring pixels where the output data has not been generated by the diffusion circuit 501. The method of diffusing data in this embodiment will be explained with reference to FIGS. 7A to 7C.

FIG. 7A shows red and black image data, and the left-hand side of the pixel of interest shown by oblique lines correspond to fields, to which a color to be outputted, red or black, have already been decided. And an upper line of the pixel with respect to the main scanning direction. Whereas, to fields corresponding to a right-hand side of the pixel of interest and the lower line of the pixel with oblique lines with respect to the main scanning direction, a color to be outputted has not been decided yet. Let the values of the red and black image data in the pixel of interest be "36" and "75", respectively, the black image data is selected to be outputted as output data since 36<75.

Since the red image data which is not outputted can not have any influence on the pixel of interest, the density of the image can not be stored. To avoid this, the non-output red data is diffused to the neighboring pixels where the output data has not yet been decided. An example of a diffusion matrix to perform this diffusion is shown in FIG. 7B. If the diffusion is performed according to this matrix shown in FIG. 7B, the new matrix becomes as shown in FIG. 7C, since the value of the red image data is "36". The values of the data are compared by using data obtained after the diffusion.

Next, the output data generating means 502 inputs the value of the image data of the color which is decided not to be outputted, to the diffusion circuit 501, then resets the value of the image data to be "0", while the value of the image data of the color to be outputted is outputted to the printer without being processed. Further, the black image data is delayed for a predetermined time period at the buffer memory 304 shown in FIG. 3. This process is for correcting the physical position gap of the electrostatic drum to expose the red image and the black image. After the black image data is delayed at the buffer memory 304 for a predetermined time period, it is outputted to the printer 204.

As described above, according to the present embodiment, a color component to be outputted at each pixel can be decided by using a simple algorithm, and density information of the entire image can be stored by diffusing non-output color component to neighboring pixels in the dot non-color mixing method. Furthermore, if the outputted color information is stored, and an area of a predetermined matrix is filled with one color can be determined, the other color can be forced to be selected. Thereby it is possible to provide an image forming apparatus capable of preventing a single color from being outputted in a group as well as capable of outputting the color data of less density before the value of the color data becomes too large owing to a data diffusion.

[Second Embodiment]

A second embodiment of the present invention is described below. The basic structure of an image forming apparatus in the second embodiment is the same as that described above in the first embodiment with reference to FIGS. 1 to 3.

FIG. 8 is a block diagram illustrating the configuration of the two-color-data processor 304 (FIG. 3) in the second embodiment.

In FIG. 8, a diffusion circuit 601 diffuses data which is not selected to be outputted by output data generating means 602 to red image data and black image data inputted from the two-color-separating circuit 303 in FIG. 3. A buffer memory 604 stores color information regarding data of pixels which have already been outputted. A method of data diffusion employed here is the same as the aforementioned method described in the first embodiment (same as the one described by using FIGS. 7A to 7C), thus the explanation of the method is omitted. The red image data and the black image data outputted from the diffusion circuit 601 are inputted to a comparing means 603, where the values of those data are compared. Then the output data generating means 602 generates the output data on the basis of the result of the comparison. In the second embodiment, the data having larger value is selected as output data.

When output data is selected, if an area of a predetermined matrix is filled with one color image data out of the red image data and the black image data, then the color image data which is not filling the area is forced to be selected.

Information on a color component of the data selected at the output data generating means 602 is stored in the buffer memory 604. This operation is the same as the one described in the first embodiment with reference to FIG. 6. However, it should be noted that, in the second embodiment, the size of the matrix is set by the CPU 206 in accordance with a random number generated by a random number generator 605, therefore, the size of the matrix is not limited to 2×3 as in the first embodiment but can be 3×5, for example. In a case where the size of the matrix is 3×5, the second embodiment differs from the first embodiment at a point where both the red and black image data are inside of the matrix, thus the data having the larger value is selected as usual. In this case, the black image data is selected. Here, non-output image data is diffused to the neighboring pixels by the diffusion circuit 601, where output data have not yet been generated.

According to the second embodiment as described above, the size of the matrix for selecting output data is set by the CPU 206 on the basis of random numbers generated by the random number generator 605, thus it is possible to provide an image forming apparatus capable of preventing a single color from being outputted in group as well as capable of outputting the color data of less density before the value of color data becomes too large owing to a data diffusion.

[Third Embodiment]

A third embodiment according to the present invention is explained below. The basic structure of an image forming apparatus in the third embodiment is the same as the one described above in the first embodiment with reference to FIGS. 1 to 3.

FIG. 9 is a block diagram showing the configuration of the two-color-data processor 304 in the embodiment.

In FIG. 9, reference numeral 501 denotes the diffusion circuit, it diffuses data which is not selected to be outputted by the output data generating means 502 to red image data and black image data inputted from the two-color-separating circuit 303 in FIG. 3. A method of data diffusion here is the same as the aforementioned method described in the first embodiment (same as the one described by using FIGS. 7A to 7C), thus the explanation of the method is omitted.

The red image data and the black image data outputted from the diffusion circuit 501 is inputted to a bias circuit 510, where a predetermined value is added to the value of predetermined color data. The predetermined color data and the predetermined value are set in a bias circuit 510 by the CPU 206.

Figure 10:
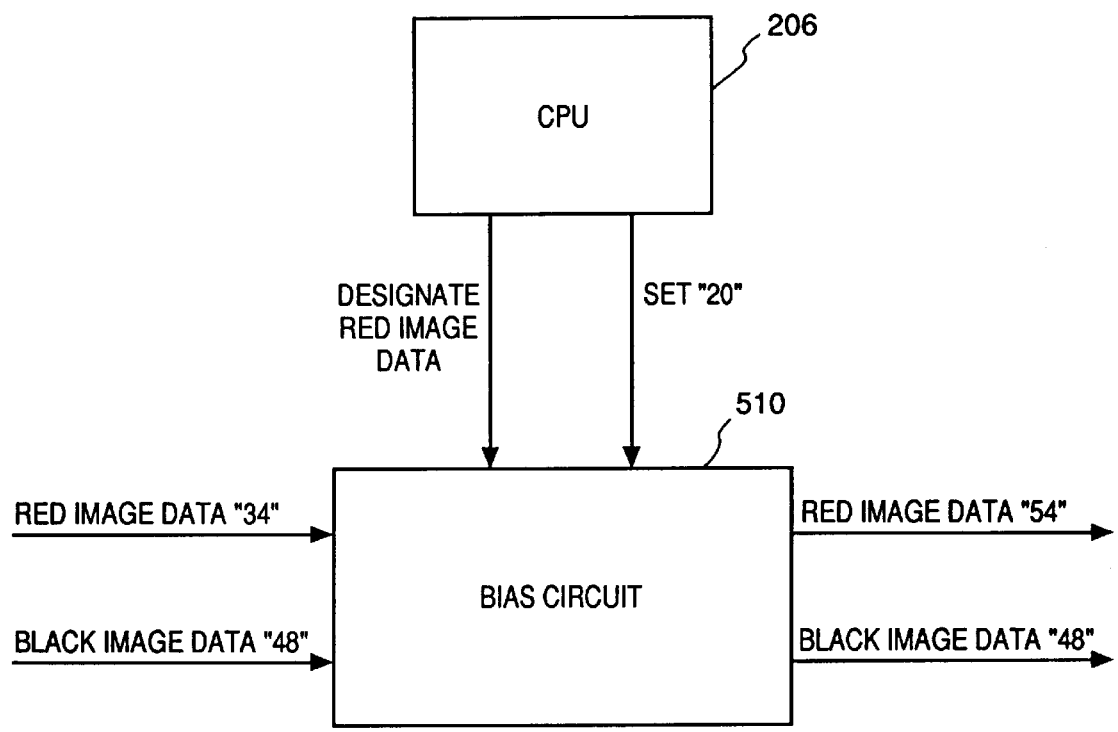
FIG. 10 shows the operation of a bias circuit of the present invention according to the third embodiment.

The value which are set in the bias circuit 510 by the CPU 206 and the flow of the color data in the third embodiment will be described below with reference to FIG. 10.

The CPU 206 designates the color data to be biased to the bias circuit 510. For example, a color component of the red image data which is not likely to be outputted is designated as a color data to be biased. Then the CPU 206 sets "20", for instance, as a bias value.

Let the values of the red image data and the black image data inputted to the bias circuit 510 be "34" and "48", respectively. The red image data which is biased while passing the bias circuit 510 where the bias value is set becomes "54" (34+20=54), and the black image data which is not biased remains "48" and is inputted to the comparing means 503.

In the third embodiment, the red image data and the black image data to which the bias process is not applied at the bias circuit 510 are inputted to the output data generating means 502.

The comparing means 503 compares the red image data and the black image data, and the output data generating means 502 selects the data to be outputted in accordance with a result of the comparison. In the third embodiment, the data having the larger value is selected as output data.

The non-output image data is sent back to the diffusion circuit 501, and the data is diffused by the diffusion circuit 501 to neighboring pixels where output data have not been generated.

According to the third embodiment as described above, it is possible to construct an image forming apparatus capable of outputting the color data of less density before the value of color data becomes too large owing to the diffusion, by adding the desired value to the value of the color component which seems less possible to be outputted.

[Fourth Embodiment]

Figure 11:
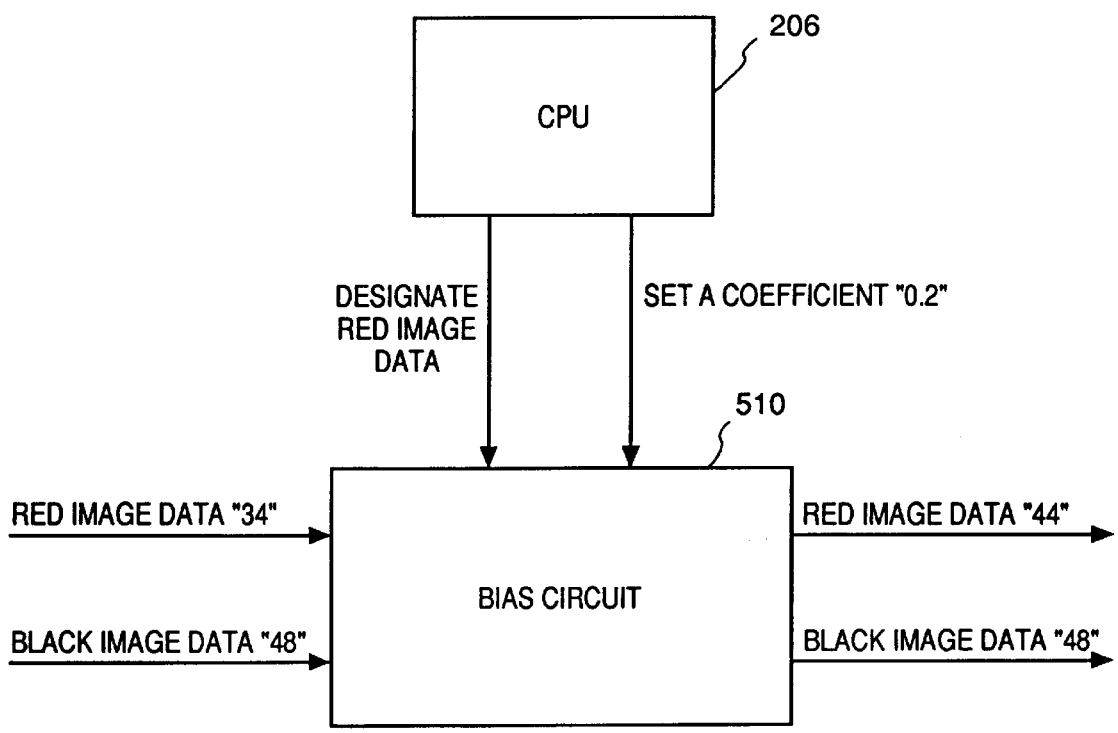
FIG. 11 shows the operation of a bias circuit according to a fourth embodiment of the present invention.

A fourth embodiment will be described below. In the fourth embodiment, instead of setting a predetermined value as a bias value in the bias circuit 510 from the CPU 206 as is described in the third embodiment, a predetermined coefficient is set. Then the color image data is biased on the basis of the coefficient. The bias process at the bias circuit 510 is that a color data which is selected by the CPU 206 is added to a product obtained by multiplying the other color data by the predetermined coefficient at the CPU 206. The value which is set in the bias circuit 510 by the CPU 206 and the flow of the color image data in the fourth embodiment are described below with reference to FIG. 11.

The CPU 206 designates the color image data to be biased to the bias circuit 510. For example, the red image data, which is probably not possible to be outputted, is designated as the color image data to be biased. Then a coefficient, for instance, "0.2" is set in the fourth embodiment, whereas "20" was set as the bias value in the third embodiment.

Assume that the values of the red image data and the black image data inputted in the bias circuit 510 are "34" and "48", respectively. While passing the bias circuit 510 where the coefficient is set, the red image data is biased to become 34+0.2×48≈44, and the value of black image data which is not biased remains "48", and those data are inputted to the comparing means 503.

Note that the red image data and the black image data inputted to the output data generating circuit 502 are the same as those that are not biased at the bias circuit 510.

The comparing means 503 compares the values of the red image data and the black image data, and the output data generating means 502 decides the data to be outputted in accordance with the result of the comparison. In the fourth embodiment, the color image data having the larger value is selected as output data.

The non-output image data is sent back to the diffusion circuit 501, and the data is diffused by the diffusion circuit 501 to neighboring pixels where the output image data are not generated. The method of diffusing data is the same as the one described in the first embodiment with reference to FIGS. 7A to 7C.

According to the fourth embodiment as described above, it is possible to construct an image forming apparatus capable of storing the density information of the entire image as well as capable of outputting the color data of less density before the value of color data becomes too large because of the data diffusion, by executing the bias process in which a color component that is not probable to be outputted is added to a product obtained by multiplying the other color component data by the predetermined coefficient.

[Fifth Embodiment]

A fifth embodiment of the present invention is described below. The basic structure of an image forming apparatus in the fifth embodiment is the same as the one described above in the first embodiment with reference to FIGS. 1 to 3.

Figure 12:
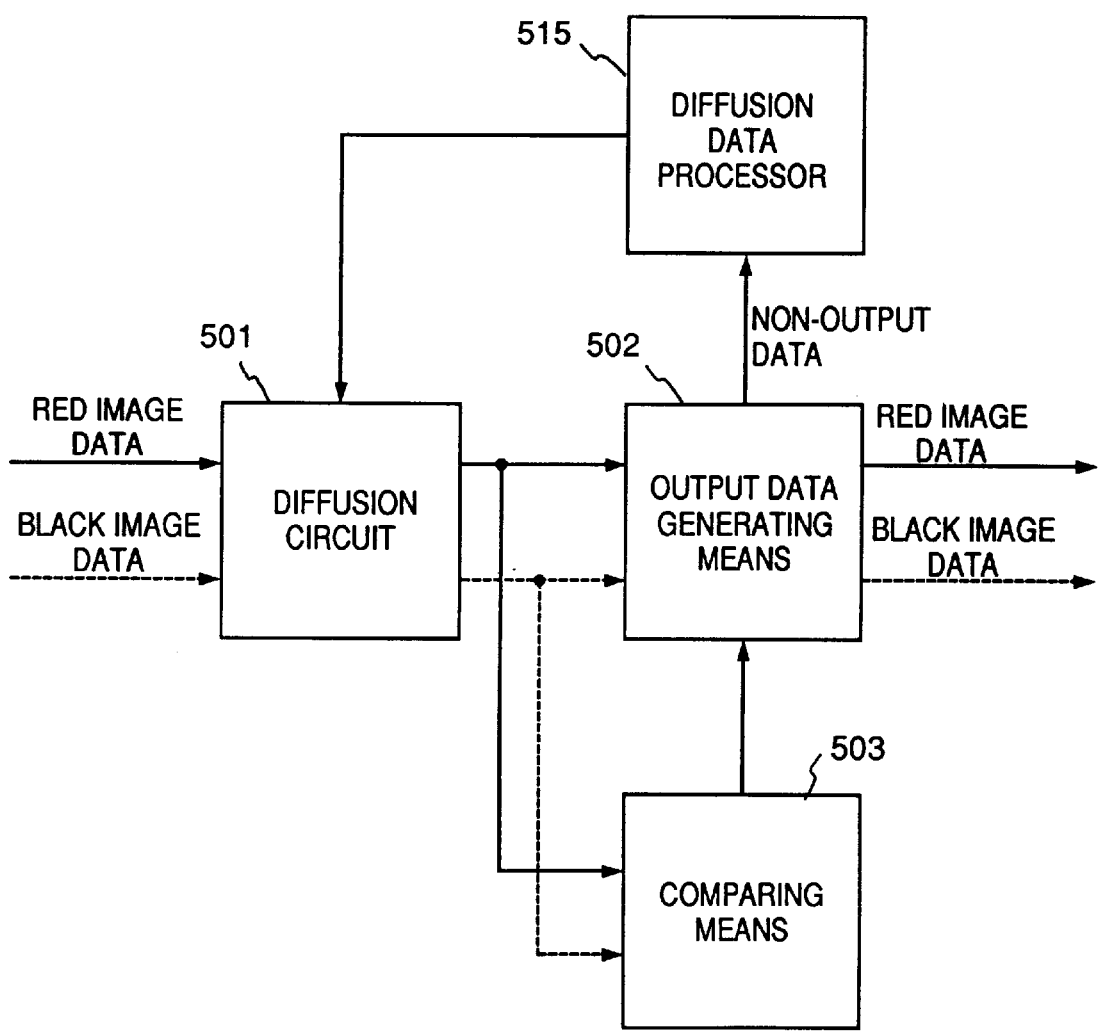
FIG. 12 is a block diagram describing the detailed configuration of a two-color-data processor according to a fifth embodiment of the present invention.

FIG. 12 is a block diagram illustrating the detailed configuration of the two-color-data processor 304 in the fifth embodiment.

In FIG. 12, the diffusion circuit 501 diffuses the data which is not selected to be outputted by the output data generating means 502 to the red image data and the black image data inputted from the two-color-separating circuit 303. Assume that the values of the red imaged data and the black image data associated with a pixel of interest are "40" and "75", respectively, in the fifth embodiment. The method of diffusing the data according to the fifth embodiment will be described later.

The red image data and the black image data outputted from the diffusion circuit 501 are inputted to the comparing means 503, where the values of data are compared. The output data generating means 502 selects the data to be outputted in accordance with the result of the comparison. In the fifth embodiment, the color image data having the larger value is selected as the output data. Therefore, the black image data is selected in this case.

Since the red image which is not outputted by the output data generating circuit 502 does not have any effect on the pixel of interest, if the red image remains as is, in the fifth embodiment, the density of the image can not be stored. To avoid this problem, the red image data, which is the non-output data, is diffused to neighboring pixels where the output data are not yet decided by the diffusion circuit 501 of a pixel of interest. In the fifth embodiment, non-output data is multiplied by a predetermined coefficient at a diffusion data processor 515 before the non-output data is inputted to the diffusion circuit 501. The predetermined coefficient is set by the CPU 206. In the fifth embodiment, "0.9" is used as the coefficient.

If the diffusion is performed in accordance with the diffusion matrix shown in FIG. 7B which is described above, the value of the red image data, which is the non-output data, is "40". However, since it is multiplied by the coefficient "0.9" by the diffusion data processor 515, the diffusion value of the red image data becomes 40×0.9=36. The diffusion process of the fifth embodiment is the same as the one described in the first embodiment, thus the description of the process is omitted.

The comparing means 503 performs comparison of data using the diffused values of the red image data and the black image data. Then, the output data generating means 502 inputs the value of the color image data which is not selected to be outputted, to the diffusion circuit 501 via the diffusion data processor 515. The value of the non-output data is set to be "0", and the color image data which is selected to be outputted is outputted to the printer without being processing its value.

According to the fifth embodiment as described above, it is possible to prevent the color of the entire image from becoming too dense by making values of the output data smaller than the actual diffusion values by multiplying the predetermined coefficient, when a color-component data of the non-output data is diffused to the neighboring pixels.

[Sixth Embodiment]

In the fifth embodiment which is described above, there is described an example which is to prevent the color of the entire image from becoming too dense by making values of the output data smaller than the actual diffusion values, which is achieved by making the diffusion value smaller by multiplying the diffusion value by the predetermined coefficient when the data which is not selected to be outputted by the output data generating means 502 is diffused to the neighboring pixels. However, the present invention is not limited to the aforesaid examples, and it is possible to prevent the color of the entire image from becoming too dense by making values of the output data smaller than the actual values, which is achieved by making the diffusion values smaller by multiplying the diffusion value by the predetermined coefficient at output time. The sixth embodiment which explains this method is described below.

The basic structure of an image forming apparatus in the sixth embodiment is the same as the one described above in the first embodiment.

Figure 13:
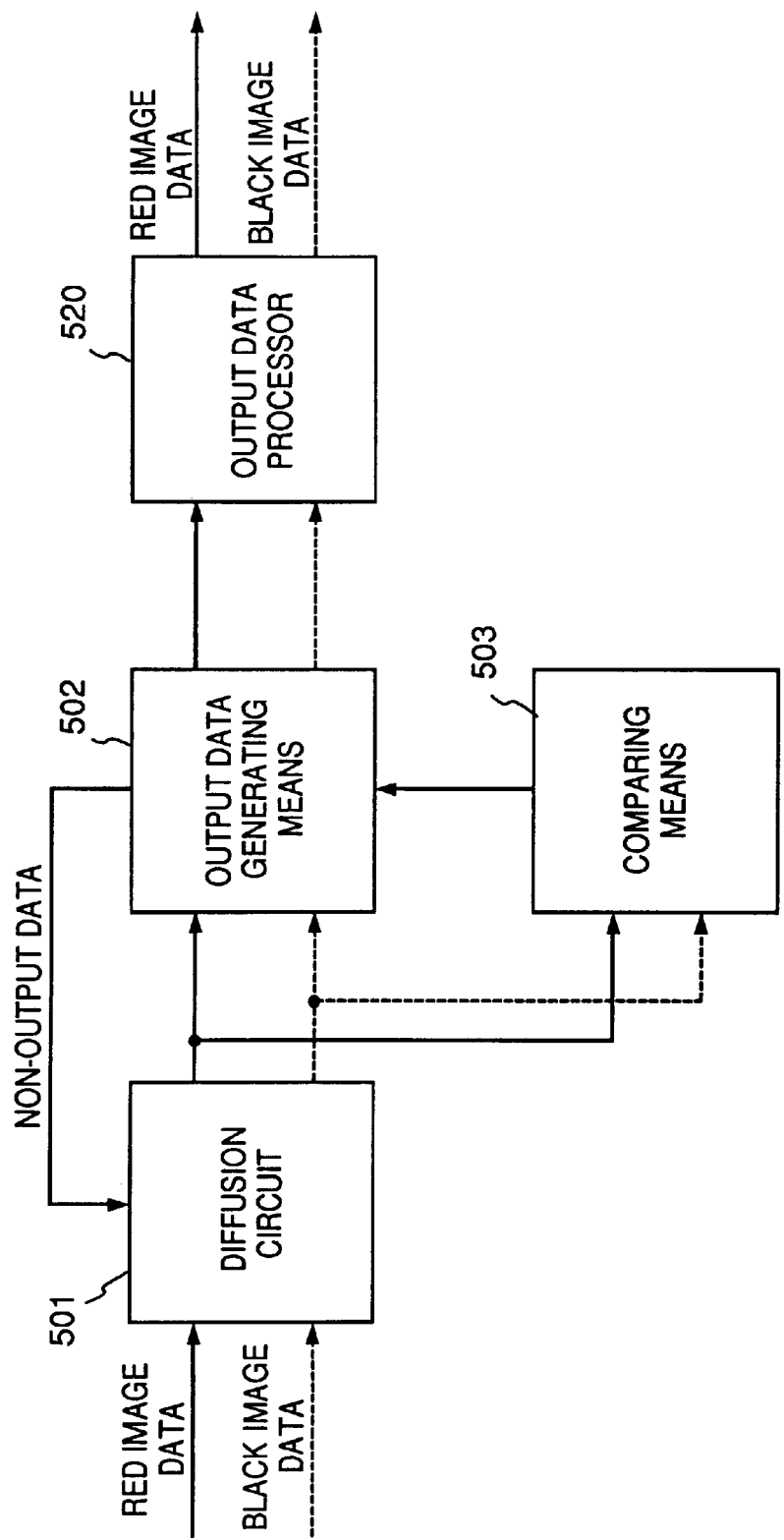
FIG. 13 is a block diagram describing the detailed configuration of a two-color-data processor according to a sixth embodiment of the present invention.

FIG. 13 is a block diagram showing the configuration of the two-color-data processor 304 in the sixth embodiment.

In FIG. 13, a diffusion circuit 501 diffuses the non-output data selected by the output data generating means 502 to the red image data and the black image data which are inputted from the two-color-separating circuit 303. In the sixth embodiment, let the values of the red image data and the black image data be "36" and "75", respectively. The method of diffusing the non-output data is the same as the one described in the first embodiment with reference to FIGS. 7A to 7C, thus the detailed explanation of the diffusion is omitted. The red image data and the black image data outputted from the diffusion circuit 501 are inputted to the comparing means 503, and the values of those data are compared. The output data generating means 502 selects the data to be outputted in accordance with the result of the comparison. In the sixth embodiment, the data having the larger value is selected to be the output data. Accordingly, the black image data is selected in this case.

The output data generating means 502 inputs the value of the color image data which is not selected to be outputted, to the diffusion circuit 501, and sets the value to be "0". Whereas the color image data to be outputted is outputted to the output data processor 520 without being processed. Before the output data is actually outputted to the printer, it is multiplied by a predetermined coefficient by the output data processor 520. The predetermined coefficient is set by the CPU 206. In the sixth embodiment, the coefficient is set as "0.9".

Therefore, the output data, which is the black image data, is sent to the printer after the operation, 75×0.9≈68, is performed.

According to the sixth embodiment as described above, it is possible to prevent the color of the entire image from becoming too dense by making values of the output data smaller than the actual values by multiplying the value of the non-output color component by the predetermined coefficient at the time of an output operation.

[Seventh Embodiment]

Figure 14:
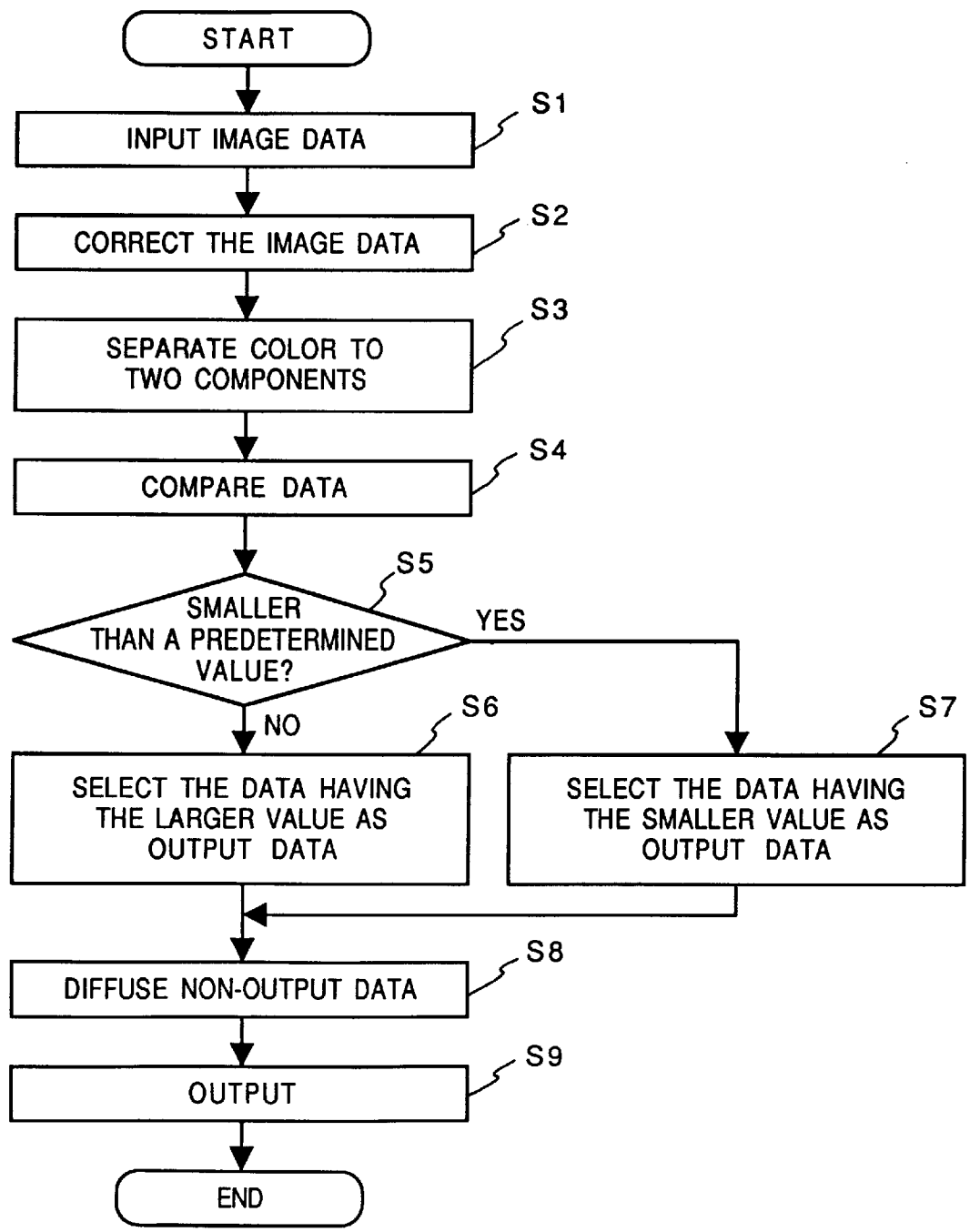
FIG. 14 is a flowchart showing the operation according to a seventh embodiment of the present invention.

A seventh embodiment is described below. The basic structure of an image forming apparatus in the seventh embodiment is the same as the one described above in the first embodiment with reference to FIGS. 1 to 5. The seventh embodiment differs from the first embodiment at the point of the algorithm to select the output data at the output data generating means 502. The selecting process of the output data at the output data generating means 502 in the seventh embodiment is described below with reference to a flowchart in FIG. 14.

In the seventh embodiment, a predetermined value is set in the output data generating means 502.

First, at step S1, luminance data is inputted by the image reading unit 201 shown in FIG. 2. Second, at step S2, the inputted color data is corrected by the shading correction circuit 301 and the tone correction circuit 302 in FIG. 3, then the process moves to step S3. At step S3, the red image data and the black image data are generated by the two-color-separating circuit 303. The generation processes of the red image data and the black image data are described in the first embodiment, thus the explanations are omitted here.

The generated red image data and the black image data are compared by the comparing means 503 at step S4. Successively, the output data generating means 502 checks whether or not the difference between the red image data and the black image data according to the result of the comparison by the comparing means 502 is with in a predetermined value which is set by the CPU 206. If it is, the process goes to step S7, where the color component data having the smaller value is selected as the image output data, then moves to step S8.

Whereas, if the difference between the red image data and the black image data determined at the step S5 is over the predetermined value, the process moves to step S6. At step S6, the color component data having the larger value is selected as the image output data, then the process goes to step S8. In both case, at step S8, the non-output data is diffused by the diffusion circuit 501 to the neighboring pixels where output data have not yet been generated. The diffusion method of the seventh embodiment is the same as the one described in the first embodiment. The output data generating means 502 outputs the color component data selected at step S9 to the printer, then the printer performs an output operation by the dot non-color mixing method.

According to the seventh embodiment as described above, in the dot non-color mixing method, it is possible to perform a proper output in case of the less dense color data by changing the output conditions with the predetermined threshold as a standard.

[Eighth Embodiment]

Figure 15:
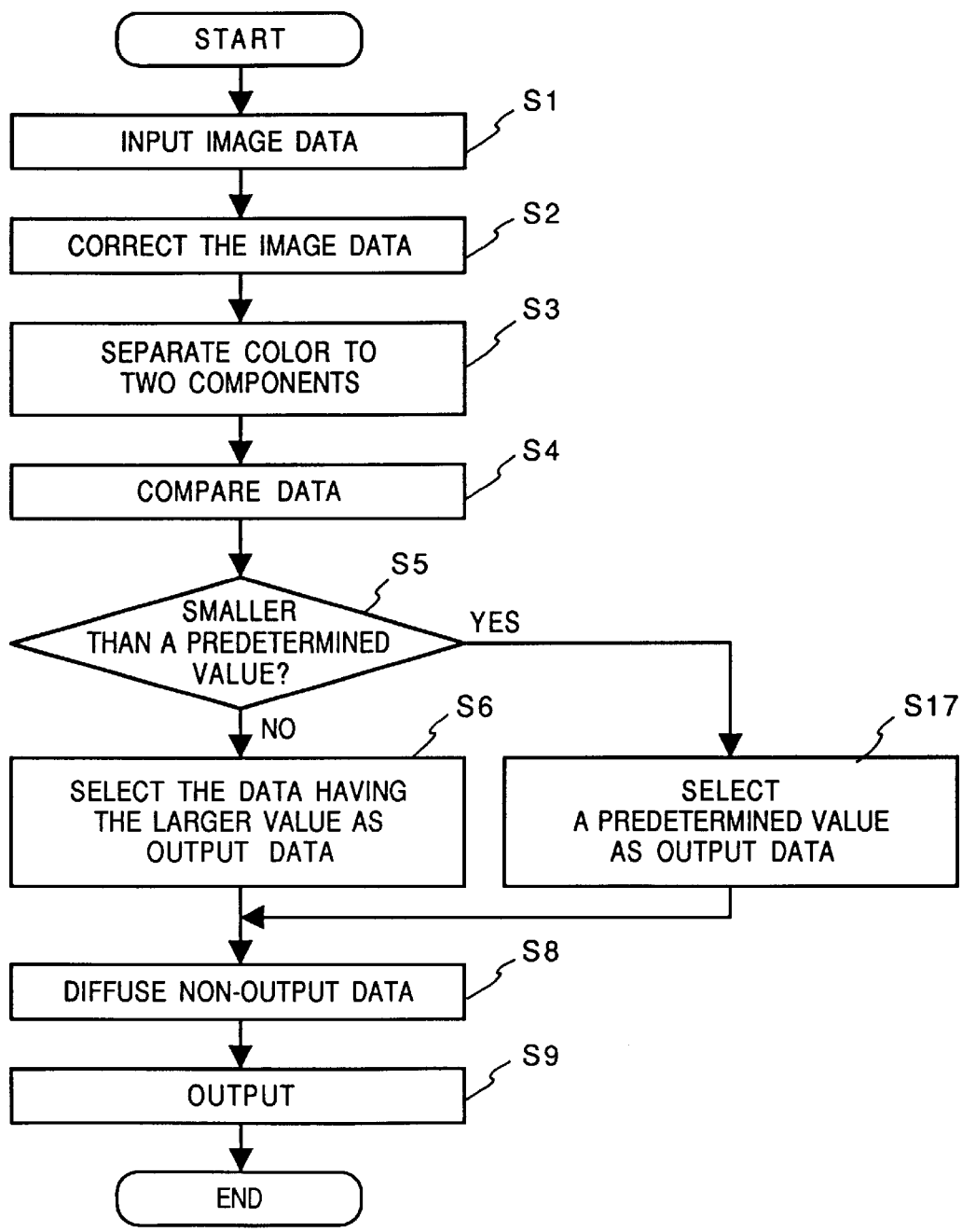
FIG. 15 is a flowchart showing the operation according to an eighth embodiment of the present invention.

An eighth embodiment is described below. The basic structure of an image forming apparatus in the eighth embodiment is the same as the one described above in the first embodiment with reference to FIGS. 1 to 5. The eighth embodiment differs from the first embodiment at the point of the algorithm to select the output data at the output data generating means 502. The selecting process of the output data at the output data generating means 502 of the eighth embodiment is described below with reference to a flowchart in FIG. 15.

In the eighth embodiment, a predetermined value is set in the output data generating means 502 by the CPU 206 similarly to the case described in the seventh embodiment. In addition, a predetermined color image data is set in the output data generating means 502 by the CPU 206 in the eighth embodiment. It should be noted that, in FIG. 15, the steps which shows the same process as the ones in FIG. 14 have the same numerals as the ones in the seventh embodiment, and the explanation of those steps are omitted.

In the eighth embodiment, at step S5, if the difference between the red image data and the black image data is within the predetermined value set by the CPU 206, the process moves to step S17, where the color image data which is set by the CPU 206 in advance is selected as the image output data, then the process goes to step S18.

According to the eighth embodiment as described above, it is possible to perform a proper output in case of the less dense color data by changing the output condition with a predetermined threshold as a standard, and by outputting the predetermined color image when the difference between the value of the red image data and the value of the black image data is smaller than the predetermined threshold.

[Ninth Embodiment]

A ninth embodiment is described below. The basic structure of an image forming apparatus in the ninth embodiment is the same as the one described above in the first embodiment with reference to FIGS. 1 to 3.

Figure 16:
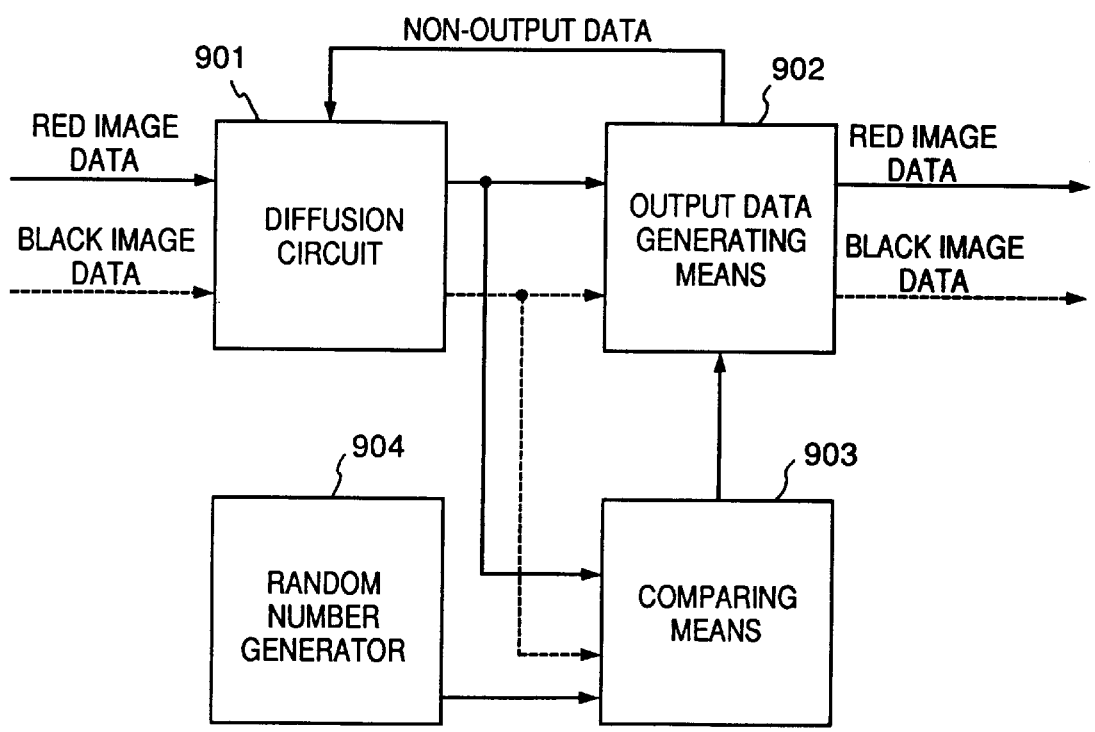
FIG. 16 is a block diagram illustrating the detailed configuration of a two-color-data processor according to a ninth embodiment of the present invention.

FIG. 16 is a block diagram showing the detailed configuration of the two-data-processor 304 in the ninth embodiment.

In FIG. 16, a diffusion circuit 901 diffuses data which is not selected to be outputted by an output data generating means 902, to the red image data and the black image data inputted by the two-color-separating circuit 303 in FIG. 3. The method to diffuse the data is the same as the one described above in the first embodiment, thus the detailed explanation of the method is omitted. The red image data and the black image data outputted from a diffusion circuit 901 are inputted to a comparing means 903, where the values of the data are compared. The output data generating means 902 decides data to output in accordance with the result of the comparison by the comparing means 903 and with a random number generated by a random number generator 904.

Figure 17:
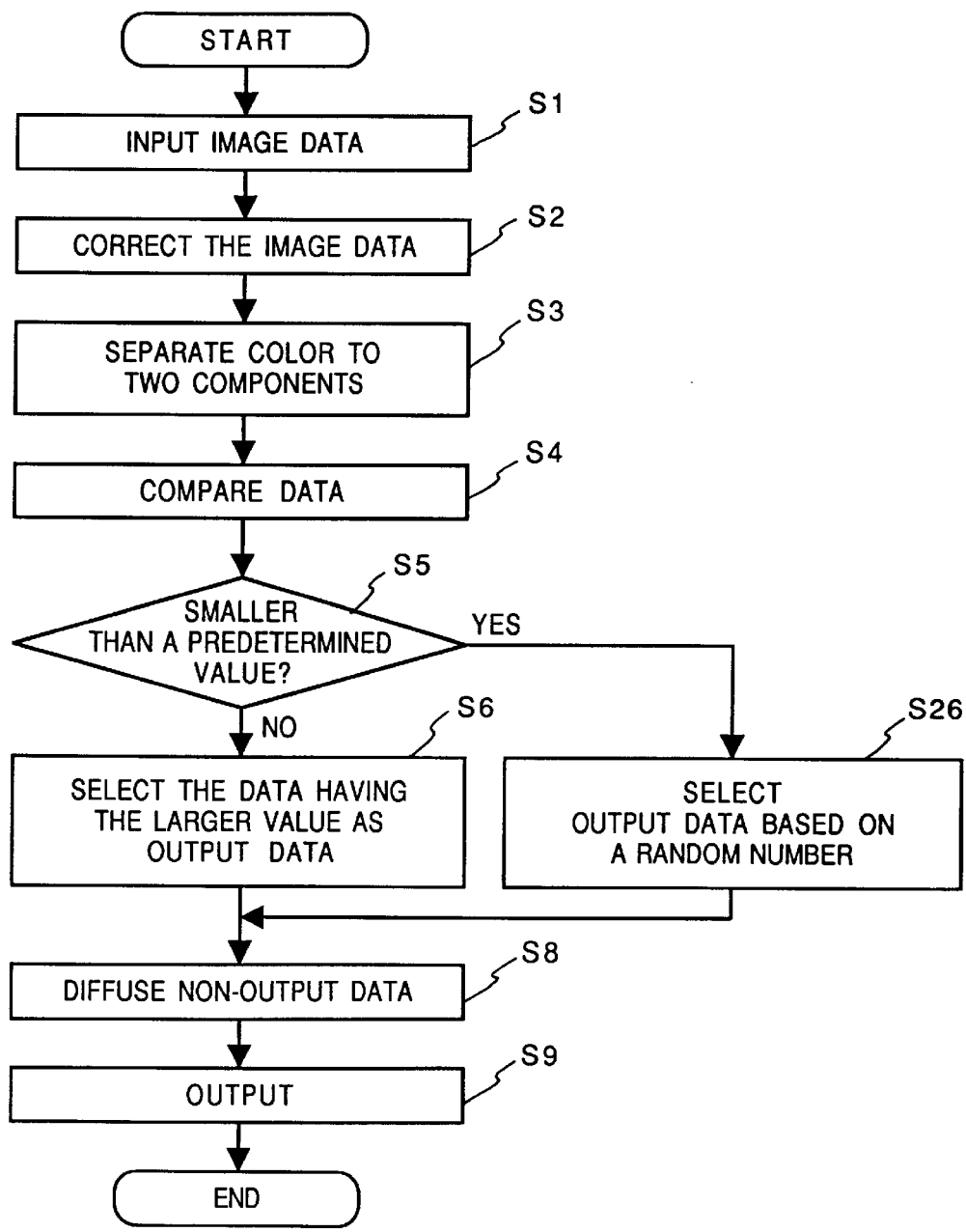
FIG. 17 is a flowchart showing the operation according to the ninth embodiment of the present invention.

The operation of an apparatus having the aforementioned structure in the ninth embodiment is described with reference to a flowchart in FIG. 17. Similarly to the seventh embodiment, in the ninth embodiment, the CPU 206 shown in FIG. 2 sets the predetermined value in the output data generating means 902 as shown in FIG. 16. In FIG. 17, the steps at which the same processes are executed have the same reference processes as the ones in FIG. 14, and the description of those processes are omitted.

At step S21 in FIG. 17, luminance data is inputted by the image reading unit 201 shown in FIG. 2. At step S22, the input color data is corrected by the shading correction circuit 301 and the tone correcting unit 302 which are shown in FIG. 3, then the process moves to step S23. At step S23, the two-color-separating circuit 303 generates the red image data. The generating processes of the red image data and the black image data are the same as ones explained in the first embodiment, therefore the description of them is omitted.

In the ninth embodiment, at step S5, if the difference between the value of the red image data and the value of the black image data is under the predetermined value set by the CPU 206, then the process moves to step S26, and the color component decided by the CPU 206 is selected as an image output data in accordance with a random number generated by the random number generator 904. After this, the process moves to step S8.

According to the ninth embodiment as described above, it is possible to perform a proper output in case of the less dense color data by changing the output condition with a predetermined threshold as a standard, and by selecting the color component decided by the CPU 206 as the image output data in accordance with a generated random number in a case where the difference between the value of the red image data and the value of the black image data is smaller than the threshold.

[Tenth embodiment]

A tenth embodiment is described below. The basic structure of an image forming apparatus in the tenth embodiment is the same as the one described above in the first embodiment with reference to FIGS. 1 to 5. The tenth embodiment differs from the first embodiment at the point of the algorithm to select the output data at the output data generating means 502. The selecting process of output data at the output data generating means 502 in the tenth embodiment is described below with reference to a flowchart in FIG. 18.

Similar to the seventh embodiment, in the tenth embodiment, the CPU 206 sets a predetermined value in the output data generating means 502.

Figure 18:
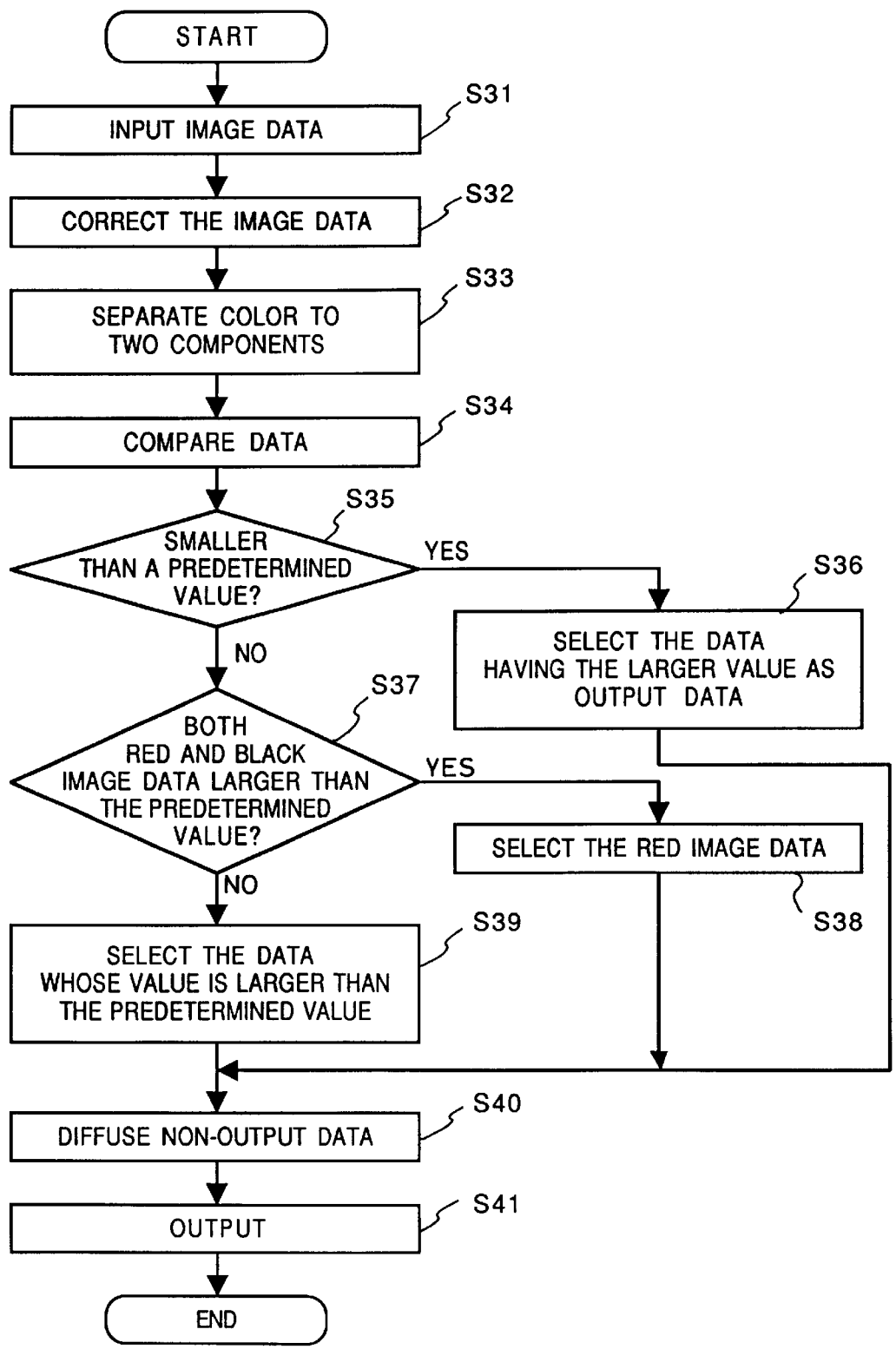
FIG. 18 is a flowchart explaining the operation according to a tenth embodiment of the present invention.

At step S31 in FIG. 18, the image reading unit 201 reads the image data which is inputted to the analog signal processor 202 shown in FIG. 2. After corrections, such as the sample and hold correction and the dark-level correction, are performed on each color of R, G, and B of the image data in the processor 202, analog to digital conversion (A/D conversion) is performed on the image data. Then the converted data is inputted to the image processor 203 as a digitized full-color signal.

At step S32, the inputted image signal is corrected in consideration of variations of characteristics of the CCD 109 for reading an original and the light distribution characteristic of a document illuminating lamp by the shading correction circuit 301 in the image processor 203. The image signal whose value is operated for correction at the shading correction circuit 301 is inputted to the tone correction circuit 302. The luminance signals R(red), G(green), and B(blue) are converted logarithmically, and each color signal is further converted to density image data of C(cyan), M(magenta), and Y(yellow) which are the complementary signals of the each color signal. Then the image signal which is converted as a density signal is inputted to the two-color-separating circuit 303 which is described in detail in FIG. 4.

At step S33, the two-color-separating circuit 303 generates the image data of red and black, which are the toner colors, based on the density signals of C(cyan), M(magenta), and Y(yellow). The detailed process of generating the image data is the same as the process in the first embodiment, thus the explanation of the process is omitted. The red image signal and the black image signal outputted from the two-color-separating circuit 303 are inputted to the two-color-data processor 304.

The red image data and the black image data which are inputted to the two-color-data processor 304 are now inputted to the diffusion circuit 501, then the diffusion circuit 501 diffuses the data which is not selected to be outputted by the output data generating means 502. The diffusion process is the same as the one in the first embodiment. The red image data and the black image data from the diffusion circuit are inputted to the comparing means 503. At the same time, the red image data and the black image data which are not processed at the diffusion circuit are also inputted to the comparing means 503. Where the data before the diffusion and the data after the diffusion are compared as shown in Step S34. Then, at step S35, the diffusion values are checked whether or not they are over the predetermined value set by the CPU 206. In a case where the both diffusion values are under the predetermined value, then the process moves to step S36, where the output data generating means 502 selects the data having the larger value as output data, and the process proceeds to step S40.

Whereas, at step S35, in a case where the value of either the red image data or the black image data is over the predetermined value set by the CPU 206, then the process goes to step S37, where whether or not both values are over the predetermined value set by the CPU 206 is checked. If both, values of the red image data and the black image data, are over the predetermined value, then process moves to step S38, and the red image data is selected to be output data in the tenth embodiment. Then, the process goes to step S40.

If it is decided at step S37 that only one value of either the red image data or the black image data is over the predetermined value which is set by the CPU 206, the process goes to step S39, and the color image data having the value which greater than the predetermined value is selected as output data, then the process proceeds to step S40.

At step S40, the diffusion circuit 501 diffuses the non-output image data to the neighboring pixels from which output data have not been selected yet. The diffusion method is the same as the one described in the first embodiment. Thus at step S41, the output data generating means 502 inputs the value of the color image data which is not yet selected to be outputted, to the diffusion circuit 501. After that, the non-output data value is set to be "0" and outputted to a printer, whereas the output color image data is directly outputted to the printer. Further, the red image data is delayed for a predetermined time period at the buffer memory 305. This is for correcting for the physical position gap in the electrostatic drum which exposes the red image data and the black image data. After the delay for the predetermined time period in the buffer memory, the red image data is outputted to the printer 204.

According to the tenth embodiment as described above, it is possible to store the density information of the entire image by diffusing the non-output color component to the neighboring pixels, and it is also possible to output the color data of less density before the value of the color data becomes too large owing to the data diffusion, by limiting the diffusion values.

[Eleventh Embodiment]

An eleventh embodiment is described below. The basic structure of an image forming apparatus in the eleventh embodiment is the same as the one described above in the first embodiment.

Figure 19:
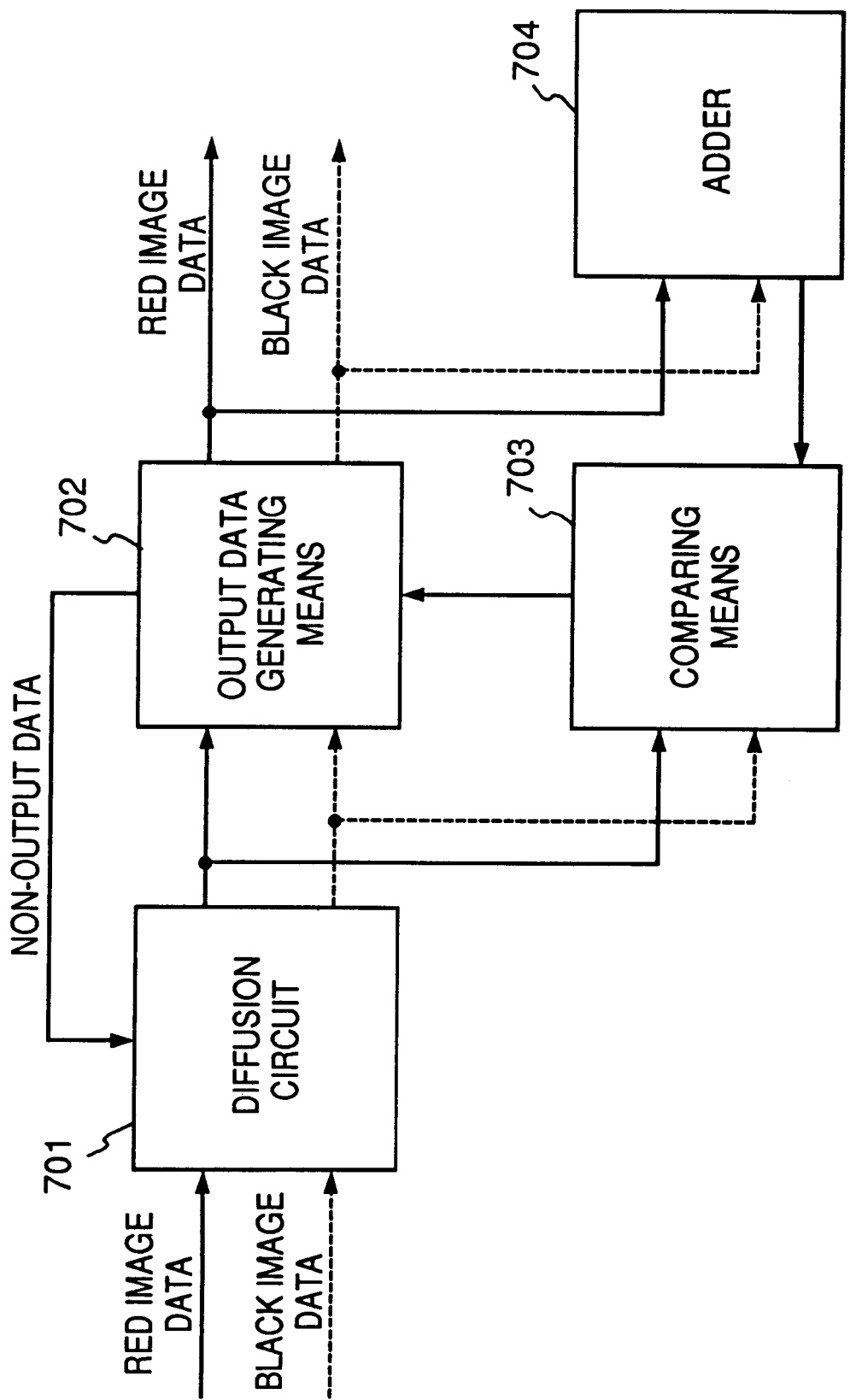
FIG. 19 is a block diagram describing the detailed configuration of a two-color-data processor according to an eleventh embodiment of the present invention.

FIG. 19 is a block diagram illustrating the detailed configuration of the two-color-data processor 304 in the eleventh embodiment.

In FIG. 19, a diffusion circuit 701 diffuses the data which is not selected to be outputted by an output data generating means 702, to the red image data and the black image data inputted from the two-color-separating circuit 303 in FIG. 3. A diffusion method will be described later. Reference numeral 704 denotes an adder, and it comprises a buffer memory capable of storing values of data corresponding to five lines in the main scanning direction which are outputted from the output data generating means 702, and it calculates total values of the red image data and the black image data which correspond to pixels neighboring to a pixel of interest inside of a 3×5 matrix, then outputs the total values to a comparing means 703.

Further, the red image data and the black image data outputted from the diffusion circuit 701 are also inputted to the comparing means 703, where a ratio of the total of the red image data from the adder 704 plus the red image data of the pixel of interest to the total of the black image data from the adder 704 is calculated. Similarly, the comparing means 703 also calculates a ratio of the total of the red image data from the adder 704, to the total of the black image data from the adder 704 plus the black image data of the pixel of interest. Then the comparing means 703 judges which ratio of the two is close to a ratio between the red image data and the black image data of the pixel of interest.

The output data generating means 702 decides the output data in accordance with the judgment result.

The operations of the adder 704 and the comparing means 703 are described below. FIG. 20 shows an example of the contents stored in the buffer memory in the adder 704. The data stored there has already been selected to be outputted, and the pixel of interest is the one of pixels where corresponding output data are going to be decided. Since the 3×5 matrix is used in the eleventh embodiment as shown in FIG. 20, the sum of the red image data becomes "193" and the sum of the black image data becomes "500".

The adder 704 inputs the values of the red image data and the black image data. The comparing means 703 calculates a ratio between the red image data and the black image data of a pixel of interest (the ratio shown on the left-hand side of equations in FIGS. 21A and 21B) and an average of ratios of the total of the red image data from the adder 704 plus the red image data of the pixel of interest to the total of the black image data from the adder 704, and of the total of the red image data from the adder 704, to the total of the black image data from the adder 704 plus the black image data of the pixel of interest (the value shown on the right-hand side of the equations in FIGS. 21A and 21B), assuming that the output data of the pixel of interest is either red or black.

Then the comparing means compares the values shown on the left-hand side and the right-hand side of the equations in FIGS. 21A and 21B. Successively, the comparison result is inputted to the output data generating means 702. In accordance with the comparison result by the comparing means 703, when the value of the right-hand side of the equation is smaller than that of the left-hand side (the case shown in FIG. 21A), the output data generating means 702 selects the red image data as the output data of the pixel of interest. This is because the ratio between the sum of the red image data and the sum of the black image data corresponding to pixels in the matrix which includes the pixel of interest, is considered as approaching the values of the red image data and the black image data of the pixel of interest.

Likewise, when the value of the right-hand side of the equation is larger than the value of the left-hand side (the case shown in FIG. 21B), the output data generating means 702 selects the black image data as the output data of the pixel of interest. This is also because the ratio between the sum of red image data and the sum of the black image data corresponding to pixels in the matrix which includes the pixel of interest is considered as approaching the values of the red image data and the black image data of the pixel of interest.

At this point, the non-output image data is diffused by the diffusion circuit 701 to the neighboring pixels whose output data have not been decided. The diffusion method of the data is the same as the one described in the first embodiment, thus the detailed description of the method is omitted.

According to the eleventh embodiment as described above, in the dot non-color mixing method, it is possible to provide an image forming apparatus capable of deciding which color component should be outputted for each pixel is dependence upon the density information as well as storing the density information of the entire image by diffusing the non-output color component to the neighboring pixels.

[Twelfth Embodiment]

A twelfth embodiment is described below. The basic structure of an image forming apparatus in the twelfth embodiment is the same as the one described above in the first embodiment.

FIG. 22 is a block diagram illustrating the detailed configuration of the two-color-data processor 304 in the twelfth embodiment. The point which differs from the eleventh embodiment in FIG. 19 is that the processor 304 has a random number generator 705. Accordingly, instead of using the total values of pixel inside the fixed-size matrix, the 3×5 matrix in the eleventh embodiment, the twelfth embodiment handles the total values of pixels inside the matrix whose size varies depending on random numbers generated by the random number generator 705 to calculate the sum of the red image data and the black image data at the adder 704.

In FIG. 22, a diffusion circuit 701 diffuses the data which is not selected to be outputted by an output data generating means 702, to the red image data and the black image data inputted from the two-color-separating circuit 303. The method of diffusing the data is the same as the one described in the first embodiment, thus the detailed explanation of the method is omitted. The adder 704 has a buffer memory capable of storing values of data corresponding to five lines in the main scanning direction outputted from the output data generating means 702. The adder 704 also calculates totals of the red image data and the black image data in a matrix around the pixel of interest, where the size of the matrix is decided in dependence upon the random numbers generated by a random number generator 705, then the adder inputs the sum to a comparing means 703.

Further, the red image data and the black image data outputted from the diffusion circuit 701 are also inputted to the comparing means 703, where a ratio between the total of the red image data from the adder 704 plus the red image data of the pixel of interest and the total of the black image data from the adder 704 is calculated. Similarly, the comparing means 703 also calculates a ratio between the total of the black image data from the adder 704 plus the black image data of the pixel of interest and the total of the red image data from the adder 704. Then the comparing means 703 judges which ratio of the two is close to a ratio between the red image data and the black image data.

The output data generating means 702 decides the output data based on the comparison result by the comparing means 703. The deciding method is the same as the one described in the eleventh embodiment. For example, let the matrix whose size is decided by the random numbers generated from the random number generator 705 be 3×5, then the total of the red image data becomes "193" and the total of the black image data becomes "500". Whereas, in a case where the size of a matrix is 2×3, an example shown in FIG. 20 indicates the total of the red image is "15" and the total of the black image is "91" from the addition of 44+23+24.

According to the twelfth embodiment as described above, in the dot non-color mixing method, it is possible to provide an image forming apparatus capable of deciding which color component should be outputted for each pixel by using random numbers and the density information, as well as storing the density information of the entire image by diffusing the non-output color component to the neighboring pixels.

The present invention can be applied to a system constituted by a plurality of devices, or to an apparatus comprising a single device. Furthermore, the invention is also applicable to a case where the object of the invention is attained by supplying a program to a system or apparatus.

The present invention is not limited to the above embodiments and various changes and modifications can be made within the spirit and scope of the present invention. Therefore, to appraise the public of the scope of the present invention, the following claims are made.

What is claimed is:

1. An image forming method comprising:

an image input step of inputting color image information;

a color discrimination step of discriminating a color of an image inputted by said image input step at each pixel;

an image processing step of generating a first color component and a second color component on the basis of the color discrimination result by said color discrimination step;

a comparing step of comparing values of the first and second color components generated by said image processing step;

a selecting step of selecting either the first color component or the second color component on the basis of the comparison result by said comparing step;

a diffusion step of diffusing a color component which is not selected by said selecting step to neighboring pixels; and an image output step of outputting a plurality of color information independently, wherein said selecting step selects the color component having the larger value out of the first and second color components on the basis of the comparison result.

2. The image forming method according to claim 1, further comprising a storing step of storing the color information outputted by said image output step, wherein said selecting step judges whether or not pixels neighboring the pixel of interest in a predetermined area are filled with one color component on the basis of the stored color information and, in a case where the predetermined area is filled with said one color component, said selecting step selects a color component data other than said one color component regardless of the comparison result by said comparing step.

3. The image forming method according to claim 2, further comprising a random number generating step of generating random numbers, wherein the size of said predetermined area can be changed depending on the random numbers generated by the random number generating step.

4. The image forming method according to claim 1, wherein said image processing step generates a color component by adding a predetermined value to color component data corresponding to the color discriminated by said color discrimination step.

5. The image forming method according to claim 1, wherein said image processing step multiplies a value of a color component which is not selected by said selecting step out of the first and second color components, by a predetermined coefficient which is less than one.

6. The image forming method according to claim 5, wherein said image processing step performs said multiplication before the diffusion by said diffusion step.

7. The image forming method according to claim 1, wherein said image process step generates a color component by adding a value, which is obtained by multiplying one of the first and second color components by a predetermined coefficient which is less than one, to the other color component.

8. The image forming method according to claim 1 wherein said selecting step selects a color component having a smaller value out of the first and second color components in a case where the difference between the first and second components is smaller than a predetermined value.

9. An image forming method which outputs a color image by separating color image information into at least two color components comprising:

a color separating step of separating a pixel of interest of a color image information to be outputted into two color components, a first color component and a second color component;

a color data generating step of generating a first color data by adding a first diffusion data to the first color component and a second color data by adding a second diffusion data to the second color component;

a comparing step of comparing the first color data and the second color data;

a selecting step of selecting one of the first and second color data on the basis of the comparison result by said comparing step;

a diffusion step of assigning color data which is not selected by said selecting step to pixels neighboring a pixel of interest in regular order, and for regarding the obtained data as the first diffusion data or the second diffusion data;

a first image forming step of forming an image by selecting a predetermined color out of at least one color in accordance with the first color data selected by said selecting step; and a second image forming step of forming an image by selecting a predetermined color out of at least one color in accordance with the second color data selected by said selecting step.

* * * * *

UNITED STATES PATENT AND TRADEMARK OFFICE
CERTIFICATE OF CORRECTION

PATENT NO. : 6,134,023
DATED : October 17, 2000
INVENTOR(S) : Tetsuya Nozaki et al.

It is certified that error appears in the above-identified patent and that said Letters Patent is hereby corrected as shown below:

Title Page,
Item [56] References Cited, U.S. PATENT DOCUMENTS, insert:
-- 5,089,884    02/1992   Suzuki et al.
   5,157,741    10/1992   Katayama.
   5,253,082    10/1992   Hayashi et al ......358/456 --.

Column 4,
Line 59, "dram" should read -- drum --.

Column 5,
Line 11, "be" should read -- to be --; and
Line 51, "an" should read -- a --.

Column 11,
Line 49, "imaged" should read -- image --.

Column 13,
Line 50, "with in" should read -- within --; and
Line 60, "case," should read -- cases, --.

Signed and Sealed this

Sixteenth Day of October, 2001

*Attest:*

NICHOLAS P. GODICI
*Attesting Officer*        *Acting Director of the United States Patent and Trademark Office*